US009245253B2

(12) United States Patent
Markman et al.

(10) Patent No.: US 9,245,253 B2
(45) Date of Patent: Jan. 26, 2016

(54) SOFT-SENDING CHAT MESSAGES

(75) Inventors: Vita Markman, Los Angeles, CA (US);
Sean O'Dell, West Hills, CA (US);
Arkady Trestman, Sherman Oaks, CA (US); Drew Beechum, Pasadena, CA (US); Paul Pak, North Hollywood, CA (US); Christian Shrigley, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 652 days.

(21) Appl. No.: 13/214,093

(22) Filed: Aug. 19, 2011

(65) Prior Publication Data

US 2013/0047099 A1      Feb. 21, 2013

(51) Int. Cl.
| | |
|---|---|
| G06F 9/44 | (2006.01) |
| G06Q 99/00 | (2006.01) |
| G06F 17/27 | (2006.01) |
| G06F 3/048 | (2013.01) |
| G06Q 10/10 | (2012.01) |
| G06Q 50/00 | (2012.01) |
| H04L 12/58 | (2006.01) |

(52) U.S. Cl.
CPC ............... *G06Q 10/10* (2013.01); *G06Q 50/01* (2013.01); *A63F 2300/5553* (2013.01); *H04L 51/04* (2013.01)
USPC ............. 715/758; 704/10; 709/202; 709/206; 715/706

(58) Field of Classification Search
CPC ........ G06Q 10/10; G06Q 50/01; A63F 13/12; A63F 2300/5553; H04L 51/04
USPC ................... 455/456.3; 704/10; 715/758, 706; 709/202, 206
See application file for complete search history.

(56) References Cited

U.S. PATENT DOCUMENTS

| | | | |
|---|---|---|---|
| 5,678,051 A | 10/1997 | Aoyama | |
| 6,139,201 A * | 10/2000 | Carbonell et al. | 704/2 |
| 7,027,974 B1 | 4/2006 | Busch et al. | |
| 8,015,051 B2 * | 9/2011 | Chen et al. | 705/7.23 |
| 8,606,726 B2 * | 12/2013 | Wurzer | 706/12 |
| 8,965,982 B1 * | 2/2015 | Sanjeev | G06F 15/16 455/412.1 |
| 2001/0029455 A1 | 10/2001 | Chin et al. | |
| 2002/0049805 A1 | 4/2002 | Yamada et al. | |
| 2002/0059379 A1 | 5/2002 | Harvey et al. | |
| 2002/0062349 A1 * | 5/2002 | Maehiro et al. | 709/206 |

(Continued)

FOREIGN PATENT DOCUMENTS

| | | |
|---|---|---|
| WO | 02070088 A1 | 9/2002 |
| WO | 2004001558 A2 | 12/2003 |
| WO | 2008109680 A1 | 9/2008 |

OTHER PUBLICATIONS

Ghayoomi M et al: "An overview on the existing language models for prediction systems as writing assistant tools", Systems, Man and Cybernetics, 2889. SMC 2889. IEEE International Conference on, IEEE, Piscataway, NJ, USA, Oct. 11, 2889, pp. 5883-5887.

(Continued)

*Primary Examiner* — Jordany Nunez
(74) *Attorney, Agent, or Firm* — Patterson & Sheridan LLP

(57) ABSTRACT

Techniques are disclosed for supplying users in an online environment with a safe and effective chat facility. The chat facility is "safe" in the sense that the ability of users to compose inappropriate messages is greatly restricted, while "effective" in the sense that users are still allowed a broad range of expressivity in composing and exchanging chat messages.

21 Claims, 16 Drawing Sheets

(56) References Cited

U.S. PATENT DOCUMENTS

| | | |
|---|---|---|
| 2002/0140726 A1 | 10/2002 | Schwartz et al. |
| 2003/0097406 A1 | 5/2003 | Stafford |
| 2003/0187632 A1* | 10/2003 | Menich ............................ 704/1 |
| 2004/0102957 A1* | 5/2004 | Levin ............................... 704/3 |
| 2004/0111479 A1 | 6/2004 | Borden et al. |
| 2005/0038650 A1 | 2/2005 | Bellegarda et al. |
| 2005/0076247 A1* | 4/2005 | Wittkotter ..................... 713/202 |
| 2005/0137851 A1 | 6/2005 | Ryu et al. |
| 2005/0154580 A1 | 7/2005 | Horowitz et al. |
| 2005/0203747 A1 | 9/2005 | Lecoeuche |
| 2005/0240439 A1* | 10/2005 | Covit et al. ....................... 705/2 |
| 2005/0278413 A1* | 12/2005 | Tannenbaum ................. 709/202 |
| 2005/0288931 A1 | 12/2005 | Kaneko et al. |
| 2006/0003838 A1 | 1/2006 | Kobayashi et al. |
| 2006/0129633 A1 | 6/2006 | Potluri et al. |
| 2007/0016401 A1 | 1/2007 | Ehsani et al. |
| 2007/0118357 A1 | 5/2007 | Kasravi et al. |
| 2007/0150426 A1 | 6/2007 | Asher et al. |
| 2007/0168511 A1 | 7/2007 | Brochu et al. |
| 2008/0071521 A1 | 3/2008 | Larvet |
| 2008/0137629 A1* | 6/2008 | Ko .......................... H04L 69/04 370/338 |
| 2008/0195571 A1 | 8/2008 | Furuuchi et al. |
| 2008/0215519 A1 | 9/2008 | Runge et al. |
| 2008/0221998 A1 | 9/2008 | Mendelsohn et al. |
| 2008/0288241 A1 | 11/2008 | Noda |
| 2009/0132528 A1* | 5/2009 | Albornoz et al. .................. 707/5 |
| 2009/0210803 A1 | 8/2009 | Brignull et al. |
| 2009/0245500 A1 | 10/2009 | Wampler |
| 2009/0253513 A1 | 10/2009 | Ducheneaut et al. |
| 2009/0271180 A1 | 10/2009 | Balegar et al. |
| 2009/0299960 A1 | 12/2009 | Lineberger |
| 2009/0319915 A1 | 12/2009 | Bates et al. |
| 2010/0010800 A1 | 1/2010 | Rehberg |
| 2010/0050074 A1* | 2/2010 | Nachmani et al. ............ 715/257 |
| 2010/0057463 A1 | 3/2010 | Weng et al. |
| 2010/0169769 A1 | 7/2010 | Jimenez et al. |
| 2011/0092221 A1* | 4/2011 | Zubas et al. ................ 455/456.1 |
| 2011/0154224 A1 | 6/2011 | Bates et al. |
| 2011/0184718 A1* | 7/2011 | Chen ................................. 704/2 |
| 2011/0201387 A1 | 8/2011 | Paek et al. |
| 2011/0270771 A1 | 11/2011 | Coursimault et al. |
| 2011/0270820 A1 | 11/2011 | Agarwal |
| 2012/0036147 A1* | 2/2012 | Borst et al. .................... 707/769 |
| 2012/0054645 A1 | 3/2012 | Hoomani et al. |
| 2012/0072404 A1 | 3/2012 | Murphy et al. |
| 2012/0101970 A1 | 4/2012 | Zernik et al. |
| 2012/0191445 A1 | 7/2012 | Markman et al. |
| 2012/0323565 A1* | 12/2012 | Hildreth et al. ................. 704/10 |

OTHER PUBLICATIONS

Hunnicutt S ED—Tubach J P et al: "Using Syntactic and Semantic Information in a Word Prediction Aid", Proceedings of the European Conference on Speech Communication and Technology (Eurospeech). Paris, Sep. 26-28, 1989; [Proceedings of the European Conference on Speech Communication and Technology (Eurospeech)], Edinburgh, CEP Consultants, GB, vol. 1, Sep. 26, 1989, pp. 191-193.

Mine et al. "Building a massively Multiplayer Game for the Million: Disney's Toontown Online". Computers in Entertainment (CIE) 1.1, Oct. 2003, pp. 1-20.

Max Kaufmann: "Syntactic Normalization of Twitter Messages", The 8-th International Conference on Natural Language Processing, Jan. 1, 2010.

Park et al. "Communication Supports for Building World Wide Internet Game Communities". Entertainment Computing-ICEC 2006, pp. 370-373.

Method for Chat Spam Prevention in a Virtual World, Oct. 31, 2008, IP.com.

Boehret, Katherin; "The Mossberg Solution: Rating the New Instant-Messaging Programs"; Feb. 7, 2007; Wall Street Journal; Eastern edition; New York, N.Y. (0099-9660). P.D.1.

European Search Report for application No. 12180938.8; Oct. 2, 2013.

European Search Report for application No. 12180939.6; Oct. 2, 2013.

* cited by examiner

SOFT-SENDING CHAT MESSAGES

BACKGROUND

1. Field

Embodiments of the invention are generally directed to computer-based online communication. More specifically, embodiments of the invention are directed to a variety of techniques for managing the content of chat messages exchanged between users in online gaming and social environments.

2. Description of the Related Art

Multiplayer video games and virtual worlds have rapidly become popular forms of online entertainment. Both generally provide users with access to a virtual environment where they may interact with one another. For example, avatars are frequently used to provide a graphical representation of each user present within a virtual environment and users interact with one another through their avatars. Users control the actions of their avatar to navigate the virtual environment, e.g., achieve gaming objectives as well as to communicate or chat with other users. Such an environment may be persistent where events occur and users interact with each other regardless of the presence of any particular user. Alternatively, such an environment may be game or session based, e.g., where a group of users participate in a match of a first-person shooter game.

User-to-user communication (i.e., chatting) is often a prominent feature within these kinds of online environments. For example, a user may chat directly with other users present in the same virtual location by typing characters into a text-field on a user interface. To promote civility and safety among users, a service provider hosting an online environment may desire to prevent the use of obscene language or other inappropriate communication, particularly in online environments developed for minors. In such a case, chat software may filter chat messages by removing swear words, slurs, or other known terms of disparagement. However, simply filtering "bad" words is inadequate as inappropriate messages are plainly not limited to simply "bad" words.

Accordingly, in some cases, a chat interface may not support users freely composing chat messages. Instead, users may chat by selecting messages from a pretended set of words or phrases. One constraint of such a system is that the set of allowed words or phrases must be defined by the online environment provider in advance. In such cases, however, users may have to type a chat message that exactly matches one of the allowed ones. In practice, this greatly restricts the expressivity of users within the virtual environment. For example, if the allowed messages includes the phrase "I want to play chess," but does not contain the phrase "I want to play checkers," the second phrase cannot be made as a selection. At the same time, entering all possible phrases is costly and time consuming and not a feasible option. Furthermore, even automatically generating new phrases and storing them in a static database is not a complete solution, since most phrases are rarely repeated again, they will simply occupy space without contributing to overall user experience.

SUMMARY

One embodiment of the invention provides a computer implemented method for facilitating communication between users. This method may generally include receiving, from a first user, a text phrase, and modifying the first text phrase to remove one or more syntactic features of the text phrase. This method may also include matching the modified text phrase against a corpus of allowed chat phrase. Upon determining the modified text phrases matches one of the allowed chat phrases in the corpus, an identifier corresponding to the matched text phrase is sent to at least a second user. In a particular embodiment, the method may also include, rendering, for view by the first user, the text phrase on an interface presenting an avatar representing the first user. And also include, rendering, for view by the second user, the modified text phrase on an interface presenting an avatar representing the first user.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
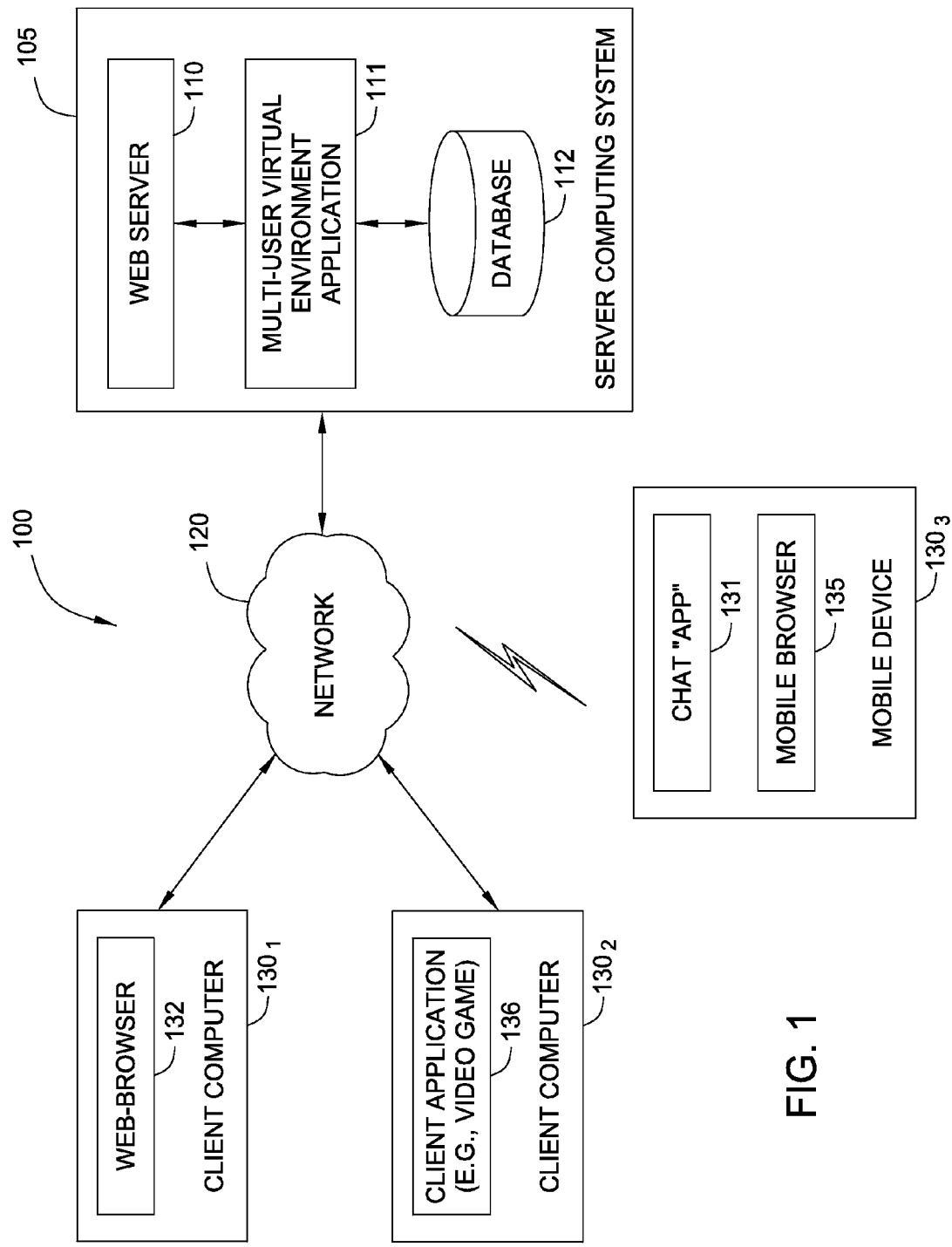
FIG. 1 illustrates a computing infrastructure configured to provide a safe and effective chat environment, according to one embodiment of the invention.

Embodiments of the invention provide a variety of techniques for supplying users with a safe and effective chat facility. The chat facility is "safe" in the sense that the ability of a user to compose inappropriate messages is greatly restricted, while "effective" in the sense that users are still allowed a broad range of expressivity in composing and exchanging chat messages. In one embodiment, the users exchange message while participating in an online virtual environment. Alternatively, users may be exchanging messages in an asynchronous manner (e.g., as SMS messages sent between mobile telephones).

A phrase chat interface may be used to compose and send messages, where users select approved phrases as chat messages. The phrase chat interface is more interactive than menu chat, where, instead of selecting from a predefined menu of phrases, a user may receive suggestions of possible allowed completions or matches for what he/she is typing. The user's selection may still be required to be an exact full phrase from the list of suggestions, thus ensuring that the phrase cannot be manipulated to say something inappropriate. For example, if a user types "hel" the phrase chat interface may suggest "hello, hello how are u?," "hello there," etc. However, the user is not allowed to send a message with the word "hell," as it is not one of the options presented in the phrase chat interface.

This approach allows the server to offer phrase suggestions to help identify known allowed phrases while a user types a message into their chat client. As the user begins to type in a phrase that they want to use, a suggestion list appears and dynamically changes as more and more of the phrase is typed. Once the phrase suggestion list contains the phrase (or partial phrase or even two-three characters) the user wants to send, they can stop typing the phrase and select it from the offered list. Doing so allows the kids to access a large number of known good phrases without having to navigate through a cumbersome multi-tiered menu selection. Instead, the user interface becomes more natural metaphor for chatting and allows the expressivity of known good phrases to be substantially increased. In one embodiment, phrases presented while a user types are ranked by their frequency of usage, thus offering the most used phrases. Because the phrases are indexed by usage it would benefit the user based on probability determined by usage of phrases in the rest of the community. Additionally, users could be provided with an option to suggest a phrase to add to the suggestion list.

Further, in one embodiment, the allowability of given phrase (or suggested phrase) is determined dynamically as a user types a phrase (or requests to send a phrase) based on a set of word combinability rules. For example, if a typed phrase is not found in a static database (e.g., a database of common phrases that can be matched quickly), it may be evaluated dynamically. For example, suppose a user types "random" and the only phrase in the static database that starts with this word is "random numbers." However, suppose further that the user wants to say "random people." The two words are safe and appropriate to combine, and the system "builds" this phrase and presents it to the user (or sends it to other users) on the fly. In this example, the words "random" and "people" are combined into a phrase using a set of grammatical rules configured to ensure that words are combined into syntactically well-formed phrases (in this case an noun phrase composed from an adjective and a noun). A set of semantic annotations on the words ensures that words are combined into phrases that are appropriate and safe. For example, semantic annotations for the word "eat" are used along with a combinability rule indicating that this verb may be combined with words from a "food" category as an object, but not as on object for words from a "people" category. Continuing with this example, another combinability rule could indicate that words in the "people" category are allowed to be combinable as a subject with the verb, "eat," as in the phrase "girl eats pizza." Such rules could also allow "random" to be combined with both "people" and "food" words as either an object or a subject. Of course, the categories and combinability rules may be tailored to the chat vocabulary of a particular cohort as well as to the messages that are (and are not) allowed to be built using that chat vocabulary.

Dynamic phrase generation also offers a way to easily interpolate avatar names into phrases, something that is not possible when relying on a static data base of phrases. Interpolating approved avatar names into phrases is not something we can do with a static phrase chat data base because avatar names change dynamically: new names enter the system all the time and can be used in a large variety of possible contexts. (e.g., "AwsomePenguin please come to my igloo" or "AwsomePenguin meet me at coffee shop" where "AwsomePenguin" is another player's avatar name).

In another embodiment, the chat system is configured to "soft" send certain messages sent by one user to others. One particular aspect of on-line chat language that significantly contributes to the explosion of new phrases—particularly for children—is the extensive use of interjections, text-speak words such as "lol," "hehe," "ok," etc., as well as use of non-conventional spelling (e.g., "u r" vs. "you are"). Such words/expressions may be referred to as "optionals" because they do not generally provide a semantic contribution to the phrase. In addition, another factor that increases the number of possible phrases users can enter is the use of upper case (e.g., "that's AWESOME" vs. "that's awesome"), word repetition "this is really really really cool" vs. "this is really cool", use of repeated letters, (e.g., "this is so cooooooooool" vs. "this is so cool"), and the use of punctuation marks, (e.g., "this is so cool!!!!!!!!!! vs. "this is so cool!"). Clearly, all of the features above can exist in any combination, thus compounding the problem even more, e.g., "this is soooooooooo sooo coolllllll!!!!!!!"

In one embodiment, messages such as these are parsed or normalized into a semi-canonical form for matching with the static word phrase database. For example, some of the variations listed above can be reduced to "this is so cool!!" by removing more than two repeated letters, removing repeated words, and limiting the number of exclamation points to two. Similar rules can expand contractions (e.g., "u r" vs. "you are"), reformat case or letter substitutions (e.g., "h1 th3r3" for "hi there"). Once a potential chat phrase is reduced to a semi-canonical form, it can be matched with a static phrase database (or in other cases evaluated using the dynamic phrase chat process mentioned above). If a match is found, then an identifier associated with the matched phrase can be sent to message recipients. That is, the phrase typed by the user is not sent to others—ensuring control over what message is actually received by recipients. That is, the phrase is "soft-sent" to the recipients. To soft-send the phrase means to send the recipients the core phrase, not the exact form of the phrase, provided the sent phrase differs from user's input in the ways outlined in above, e.g., it contains optional expressions, non-conventional spelling, more than three punctuation marks, and word/letter repetitions. Thus, if the user types "LOL, that's funny!!!!!!" what is soft-sent and shown to other users is "that's funny!!!" Note, the sending user might be presented with the original message in the chat interface (e.g., in a text-bubble hovering over their avatar).

Additionally, the "soft send" could allow some variations phrase to be sent with the phrase identifier. For example, if the user included a majority of letters in upper case, then the phrase could be presented to recipients in all caps. Similarly, the phrase could be decorated with same number of exclamation points presented by the user. While this approach does in some ways limit user expressivity, it still allows users to communicate using a broad range of semantically equivalent content. Further, this approach prevents a variety of inappropriate messages from being embedded in the semantic variants. Consider, e.g., the phrase "I like gRAPEs."

As noted, in one embodiment, phrase suggestions are made to a user while they compose a chat message. In one embodiment, in addition to the phrase typed or chosen by a user, a large set of extra textual data may be applied to provide more accurate (and therefore better) suggestions. Examples include: the popularity of the phrase, the user's chat history, guest's avatar level and current activities, quests, locations and items held within the game. For example, kids located in a virtual pizza parlor are more likely to talk about pizza. This data could be used to aggressively favoring phrases containing "pizza" in the suggested phrases as it is more like the user intends to say "I like pizza" instead of "I like penguins." The chat software may identify the suggestions using relevance data derived from a variety of sources, e.g., chat history analysis, online environment, in-game social interactions, user-specific data (e.g., age, gender, location), expert tagging, semantic tagging, external game data (e.g., quests). The result is a small set of returned suggestions that may be more likely to reflect the user's intended statements, yielding reduced typing, faster results and less frustration for users.

Note, while discussed separately, the techniques for supplying users in an online environment with a safe and effective chat facility, one of ordinary skill in the art will recognize that the disclosed techniques may be combined, to operate in conjunction with one another as well as combined with other techniques for managing a chat facility provided to users of a virtual environment. Further, while some functionality is described as being provided by server components and some by client components, such distinctions are made to facilitate the following description. Further still, while virtual online environments are described as an environment where monitoring chat functionality may be useful, the approaches described herein may be adapted for use in variety of situations where individuals use software to send chat messages to one another. For example, in addition to a chat facility within a virtual world, embodiments may be used to manage chat messages exchanged between individuals sent as SMS messages on mobile telephones or messages sent using a variety of different software applications and/or chat protocols.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates a computing infrastructure 100 configured to provide a safe and effective chat environment, according to one embodiment of the invention. As shown, the computing infrastructure 100 includes a server computing system 105, and client systems $130_{1-3}$, each connected to a communications network 120. Illustratively the server system 105, includes a web server 110, a multi-user virtual environment application 111, and a database 112. As described in greater detail below, the database 112 may store user account data, chat histories, a word corpus, word metadata, and combinability rules used to manage chat interactions among users of the multi-user virtual environment application 111.

The client systems $130_{1-3}$ communicate with the web server 110 over the network 120 to access multi-user virtual environment application 111, i.e., to access an online virtual environment or game hosted by the server system 105. Of course, other approaches for network communication could be used instead of (or in addition to) a web server and the well-known HTTP protocol.

In this particular example, client system $130_1$ represents a computer system running a web-browser 132. Accordingly, client system 130₁ is representative of desktop PCs, laptop computers, home-theater PCs (HTPCs), and other computing systems capable of running a web-browser. Similarly, client system 130₂ represents a mobile device such as a mobile telephone, tablet computer, or portable MP3 player, etc. As shown, the mobile device 130₂ includes a mobile web-browser 135 as well as dedicated chat "apps" 131.

In one embodiment, the virtual environment (or user chat facility) provided by the application 111 may be accessed using the web browser 132 or mobile browser 135. Alternatively, virtual environment provided by the application 111 may be accessed using a stand-alone application programs (or chat "app" 131) executed on the mobile device 130₂. In addition to accessing a virtual environment, mobile device 130₂ may be used to send chat or text messages from one user to another (as can client system 130₁ using web browser 132 or other application software. Similarly, client device client system 130₁ represents a computer system executing a client application 136 configured to access the access the multi-user virtual environment application 111. For example, client system 130₁ could be a computer system or a video game console executing a video game application that includes a multi-user component along with user-to-user chat facilities.

In each of these cases, a user interface may provide a mechanism for a user to compose chat messages sent to other users within the virtual environment provided by the application 111. Further, the application 111 may include components configured to manage chat messages sent by a given user in order to provide an appropriate online environment for a given user community. For example, for a virtual environment developed for pre-teen children, the chat phrases allowed to be sent among users could be limited so as to prevent users from sending, e.g., offensive, bullying, or inappropriate messages.

Figure 2:
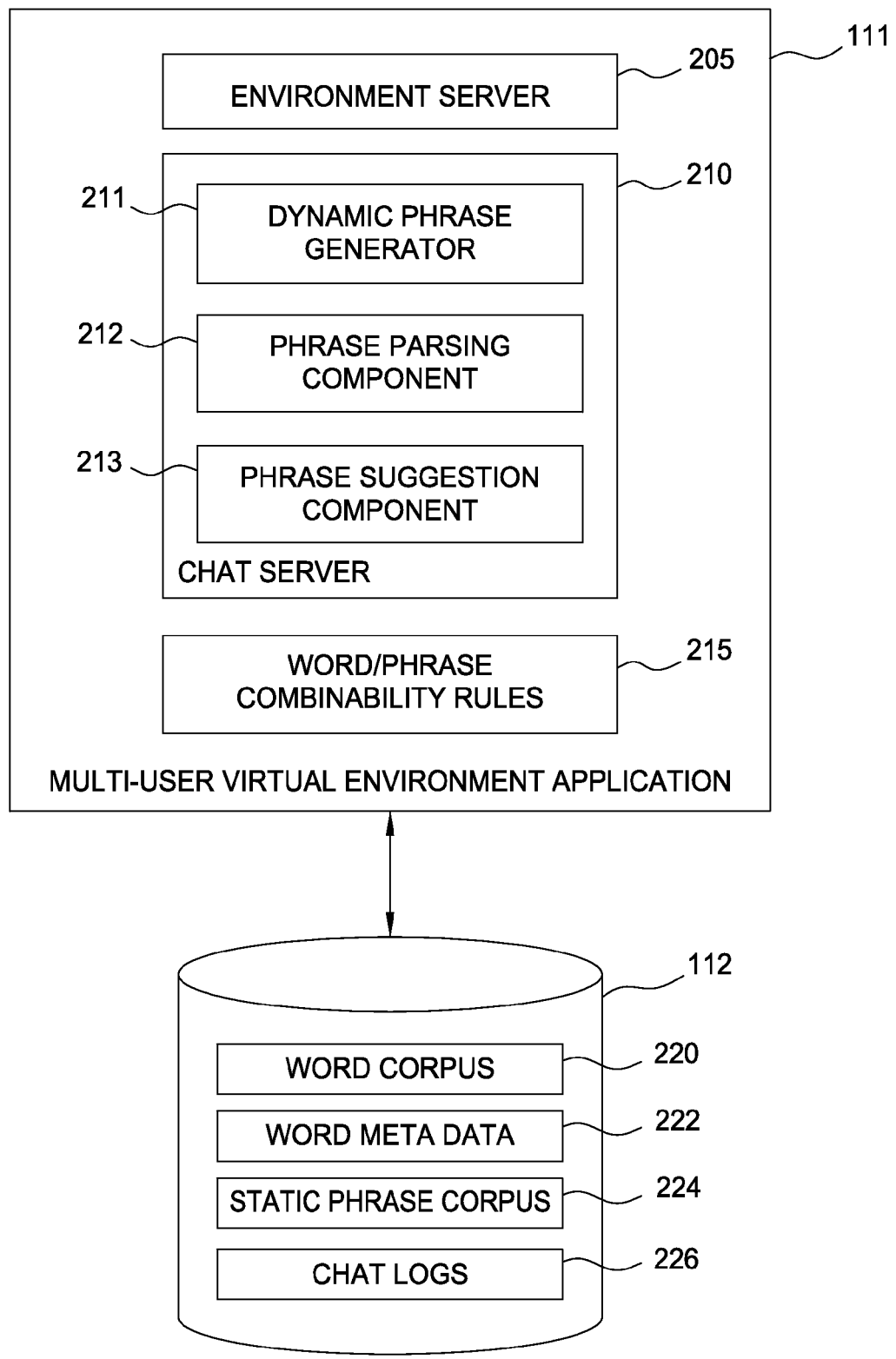
FIG. 2 illustrates an example of a multi-user virtual environment application, according to one embodiment of the invention.

FIG. 2 illustrates a logical view of components of the multi-user virtual environment application 111, according to one embodiment of the invention. As shown, the virtual environment application 111 includes an environment server 205, a chat server 210, and a set of word/phrase combinability rules 215. Additionally, the virtual environment application 111 may interact with a database 112. In this example, the database 112 stores a word corpus 220, word metadata 222, static phrase corpus 224 and chat logs 226.

The environment server 205 provides a software application configured to host a particular virtual environment. For example, environment server 205 could provide a virtual ski resort allowing users to interact and play or provide virtual shopping mall again allowing users to interact with one another but also allowing users to purchase virtual (or real) goods and services. Other examples include online gaming environments (e.g., a virtual car race track or first-person shooter). Regardless of the particular virtual environment, the chat server 210 may allow users to compose (or select) chat massages to communicate to other users. To facilitate such communication, the chat server 210 may include a phrase generator 211, a phrase parsing component 212, and a phrase suggestion component 213. Of course these (or other components) may be combined or further subdivided in a particular case.

In one embodiment, the phrase generator 211 provides a software component configured to dynamically generate allowed chat message phrases from content composed by (or suggested to) a user. For example, assume a user types "red." In such a case, the phrase generator 211 may identify this word in the word corpus 220 and retrieve word metadata 222 associated with this word. In this example, the metadata 222 could indicate that the word "red" is grammatically an adjective, categorized as being a color. More generally, the word metadata 222 may provide a collection of information describing grammatical function and use for words in word corpus 220 as well as an ontology characterizing the semantic meaning of words in the word corpus 220 as well the semantic meaning of larger phrases in the static phrase corpus 224.

Further, the word/phrase combinability rules 215 could indicate what word categories (i.e., a color category for adjectives) are allowed to be combined. For example, the word/phrase combinability rules 215 could indicate that words categorized by the metadata 222 as being "colors" can be combined with nouns of a certain type (e.g., words categorized by the metadata 222 as being food, or more specifically, fruit) to form a noun phrase, but not with the words categorized as referring to "persons." Thus, if the user continued to type "apple," the phrase generator 211 could generate a chat message that included the phrase "red apple" but would not do the same if the user typed "red girl." Additionally, even prior to the user typing "apple," the phrase suggestion component 213 could identify words in the category "food" (or "fruit") as being combinable with words categorized as being "colors" and make suggestions about what words could be combined with the first word (i.e., with "red"). In many cases, the categories could allow for large numbers of words to be combined. Accordingly, the phrase suggestion component 213 could be configured to select which ones to present as suggestions using a variety of criteria, including, e.g., chat history analysis, online environment, in-game social interactions, user-specific data (e.g., age, gender, location), expert tagging, semantic tagging, external game data (e.g., quests).

Additionally, as described in greater detail below, the suggestions for a given phrase may change as elements are added to the phrase. For example, a first set of relevant suggestions may be determined for the word "red" and if the user typed "apple," a second set of relevant suggestions may be determined for the phrase "red apple," such a process could continue creating suggestions for larger and larger phrases (e.g., as the user typed (or selected) the verb "are" and object "tasty"). That is, whether selected by a user typing out the word "apple" or by a user selecting the suggestion to add "apple" to "red," resulting in the phrase "red apple," (a noun phrase) being dynamically generated, the phrase generator 211 could further suggest additional words which this noun phrase could be combined with.

Thus, the process for dynamically generating phrases can be nested, where first the individual words of "red" and "apples" are evaluated relative to the word/phrase combinability rules 215—resulting in the phrase "red apples." The combinability rules 215 could indicate that a noun phrase of type "food" or "fruit" could be further combined with an intransitive verb or with a transitive verb and an object (e.g., are tasty). More generally, the combinability rules 215 can be applied to the word corpus 220 to build allowed chat phrases out of smaller components (e.g., individual nouns and verbs) as well as larger grammatical elements (e.g., what categories of adjective phrases are combinable with words/phases in other categories).

In one embodiment, the phrase parsing component 212 may be configured to parse and edit a chat message typed by a user. For example, the phrase parsing component 212 may be configured to remove so-called "optionals" from a chat message. Doing so may reduce a chat phase down to a semi-canonical form used for matching with the phrase corpus 224 or for evaluating using the dynamic phrase generator 211. If a match is found, then an identifier corresponding to the user's chat message may be sent to other users present within the virtual environment.

The chat logs 226 may store chat histories for users. The chat logs 226 may be used to periodically determine the word corpus 220. For example, the logs 226 may be evaluated to determine the most frequently used words (or phrases) for a given on line environment or given user community within an online environment—up to a given number of words (e.g., 20,000). Periodically regenerating the word corpus 220 allows it to evolve as the language patterns of users change over time.

Figure 3:
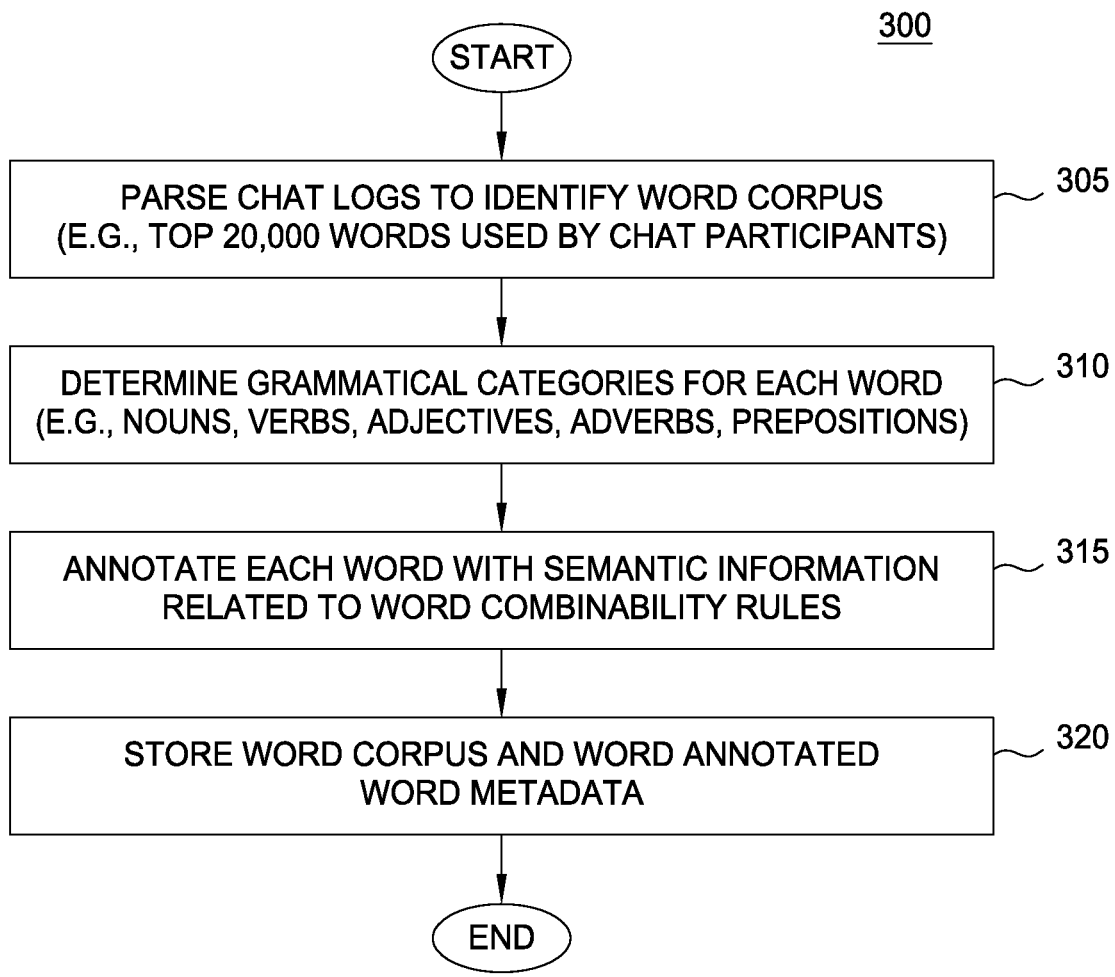
FIG. 3 illustrates a method for generating a dynamic phrase chat corpus, according to one embodiment of the invention.

FIG. 3 illustrates a method 300 for generating a dynamic phrase chat corpus, according to one embodiment of the invention. As shown, the method 300 begins at step 305 where a word corpus is generated. The word corpus provides a chat vocabulary for chat messages in a given virtual environment. For example, the chat server may identify the 20,000 top-used words in the current chat logs. Note, experience has shown that 20,000 words generally corresponds to the size of the chat vocabulary pre-teen users exhibit in composing chat messages in online environments (after most of the spelling is corrected and punctuation/capitalization is removed). Of course, for other user cohorts, a different number of words may be used.

In addition to evaluating a chat log, the content of the chat vocabulary may be modified manually. For example, a moderator may monitor the interactions between users of an online environment to identify phrases that should be allowed (with words that need to be added to the vocabulary) as well as identify phrases that carry an inappropriate message that are nevertheless allowed by the system to be sent. Similarly, as users' language evolves or specializes within a given community or environment, the moderator may add words to the vocabulary.

At step 310, the words identified at step 305 are divided into grammatical categories, e.g., nouns, verbs, adjectives, adverbs, prepositions, etc. At step 315, the words in each grammatical category are annotated with broad semantic information (e.g., whether a given word denotes a food item, clothing item, or action, etc.) and with its grammatical function (e.g., whether it is a verb, noun or adjective). For example, the word "orange" may be annotated as being a noun belonging to both a category of "food" and a sub-category of "fruit," as well as annotated as being an adjective belonging to a category of "color." Thus, the annotations create an ontology of semantic meaning for the words in the word corpus. Note, preferably, the semantic categories should be relatively narrow, without being too fine grained. For example, while a "food" and a "drink" category are likely to be appropriate in scope for an ontology of words used by children in composing chat messages, a category of "cheeseburger" or a "soda" category are likely to be too fine-grained. In one embodiment, the scope of the categories may be tailored to result in categories having a certain minimum (and/or maximum) number of members.

For each word category, other categories that a given word category can be combined with are specified. Further, an allowed word order for combining words/phrases may be specified as well. That is, the world/phrase combinability rules for the word categories are also specified at step 315. For example, adjectives in a "color" category {red, green, orange} may be specified as being combinable when preceding nouns tagged as being "food" or "fruit" {apple, tangerine, pear}. Doing so results in allowed possible phrases such as {red apple, red tangerine, red pear . . . }, but not {apples red or pears green}. Similarly, a category "disparaging" which included the nouns {fat, ugly} could be limited to being combinable with a small range of phrases, e.g., nouns in an "animal" category such as "penguin" or "cat" but not with words in a "people" category (e.g., "girl," boy," "you," or avatar names.). This helps avoid inappropriate phrases from being created.

Some combinable phrases may nevertheless be unusual, e.g., "random pear," "serious apple," or "orange orange." However, nonsensical phrases are encouraged, particularly in online environments where children interact with one another. In such cases, as children play "pretend" all the time and often chat using unusual word combinations. At the same time, only allowing words in certain categories to be combined helps ensure that the resulting communications are limited to ones deemed in advance to not result in inappropriate, offensive, or otherwise unwanted chat phrases.

Tables I-III, below, provide a small example that illustrates a set of allowable word combinations generated from steps 310 and 315. Of course, the words and categories in Tables I-III are by no means exhaustive. Instead, this approach is readily extended with more words and thus translates into a robust methodology for dynamically generating new safe phrases that may be served up as suggestions for phrases, e.g., when no matches are found for the user's input in the static database.

TABLE I

Adjective Combinability Example:

| Adjectives | Nouns types can combine with | Predicates can combine with | Examples of allowable phrases |
|---|---|---|---|
| Red | food, natural events, clothing | is, are, become, go, turn | Is red, becomes red, go red, red apple, red pear, turn red, red snow |
| Green | food, natural events, clothing | is, are, become, go, turn | Is green, becomes green, go green, green apple, green pear, green avalanche |
| Yellow | food, natural events, clothing | is, are, become, go, turn | Is yellow, becomes yellow, go yellow, turn yellow, yellow apple |
| Orange | food, natural events, clothing | is, are, become, go, turn | Is orange, becomes orange, go orange, turn orange, orange apple, orange pear, |

TABLE II

Noun Combinability Example:

| Noun | Nouns types | Subject of predicate | Object of predicate | Examples of allowable phrases |
|---|---|---|---|---|
| Apple | Food, subtype Fruit | is blue, is green, is red, is orange, is awesome, is serious | Eat, see like | Apple grows here, red apple, green apple, eat apples, see apples, like apples, |
| Sky | natural events | is blue, is green, is red, is orange, is awesome, is serious | See, like | Sky is blue, sky is green, sky is awesome |
| Girl | People | Runs, likes, walks, | See | Girl runs around, Girl likes apples, see girl |

TABLE II

Predicates Example:

| Predicates | Subject | Subject person | Subject number | Examples of allowable phrases |
|---|---|---|---|---|
| Is awesome | Food, natural event, People | Third-person | Singular | Apple is awesome, sky is awesome. Girl is awesome |

As further part of step 315, chat phrases generated by combining words in the categories may themselves be tagged with grammatical information. Doing so allows a base phrase to be combined with other words the user may type. For example, if "red apple" is tagged with a tag "noun, adjective, 3rd-person, singular, subject/object, food," this indicates the phrase can be put in the subject position of a noun phrase or object position of a predicate and has grammatical properties such as 3rd-person and singular, and semantically categorized as being a kind of food. At step 320, the resulting word corpus and annotated word metadata may be stored in a database. Once stored, the chat server may evaluate user input to dynamically generate allowable chat parse messages sent to users of an online environment or community.

Figure 4:
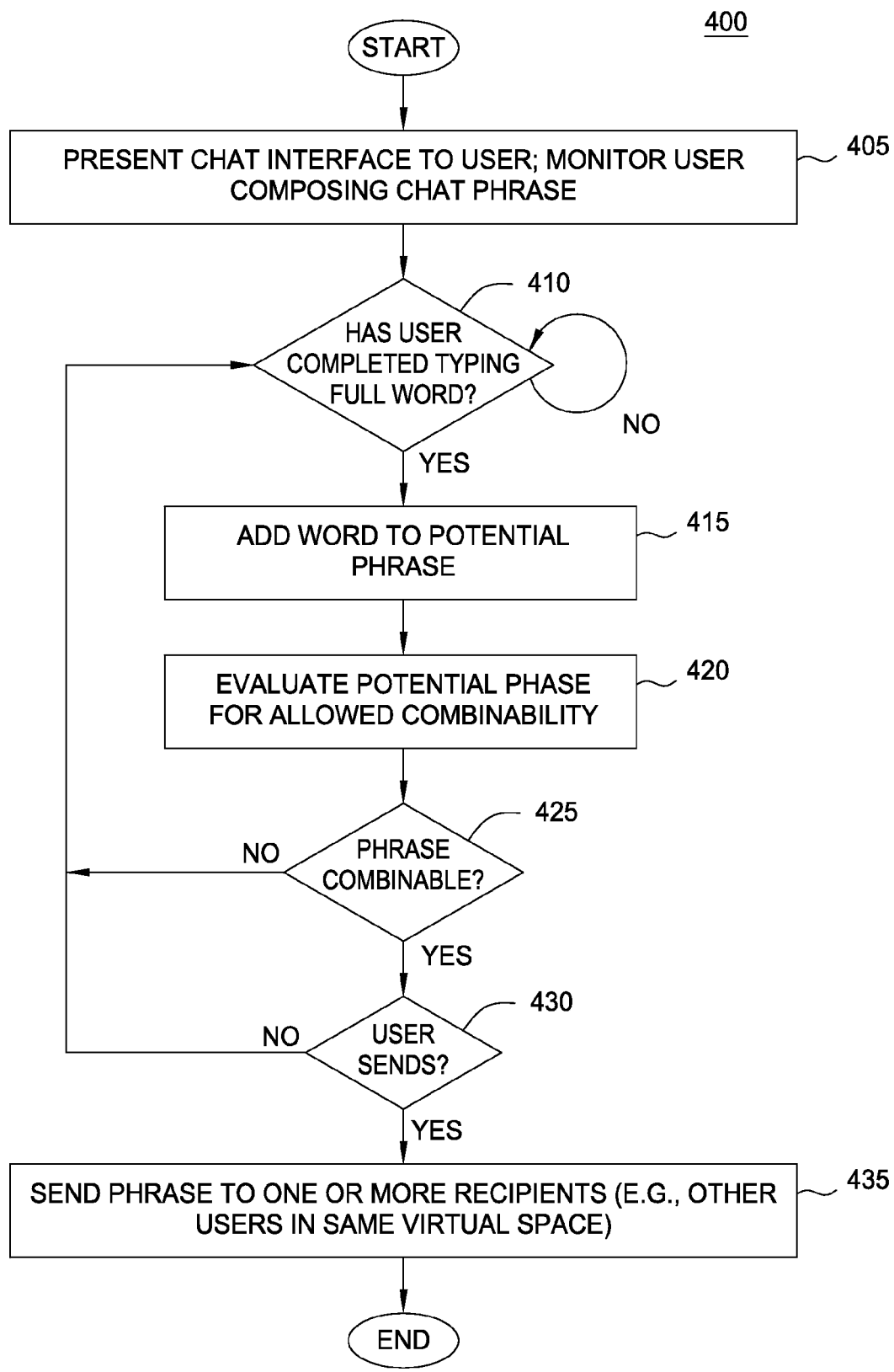
FIG. 4 illustrates a method for dynamically suggesting and/or evaluating allowable phrase chat messages for users of an online environment, according to one embodiment of the invention.

FIG. 4 illustrates a method 400 for dynamically suggesting and/or evaluating phrase chat messages for users of an online environment, according to one embodiment of the invention. As shown, the method 400 begins at step 405 where a chat interface is presented to a user as part of accessing an online environment. For example, the user may log on to a virtual online community, where the presence of that user is indicated by an avatar visible to other users of the community and where the user sees the avatars representing other users of the online community present at any given time.

The interface to such an online environment may allow the user to compose chat messages to send to other users. As described above, the range of available chat phrases may be limited to words in a predefined word corpus and word categorizations indicating what words in such a corpus can be combined with one another (and the order in which such words in different categories can be combined with one another). In addition to allowable chat phrases determined dynamically, a given phrase may also be compared to a static corpus of allowed phrases.

At step 410, the chat server may determine whether a user has completed typing a word (or other portion of a chat message) or selected to augment a current phrase with a suggested word (or phrase) derived from the combinability rules. For example, given the noun phrase "red apple," Table III indicates that this phrase (a food, $3^{rd}$ person singular noun phrase) is combinable with the predicate "is awesome." Accordingly, the phrase "is awesome" could be suggested to the user. If the user then selected to add a suggested word (or phrase), that word (or phrase) is added to a potential chat phrase (step 415).

More specifically, assume again that the user types the phrase "red apple," (or after typing the word "red" selects the suggestion of "apple" over suggestions "peach," "sky" or "hat"). The phrase "red apple" is combinable according to the rules shown in Table I, above. As noted, the resulting allowable chat phrase "red apple" can be tagged with semantic information and compared with subsequent user input. For example, if, after typing "red apple" the user continues typing "is awesome," these additional phrase elements can be evaluated to determine whether "red apple" can be further combined with the predicate "is awesome" and if it can, the longer phrase "red apple is awesome," is generated. To evaluate this longer phrase, semantic data from the current phrase "red apple" is extracted. In this example, the phrase "red apple" could be tagged with: "red apple: tag={adjective, noun, third-person, singular, food, subject/object}. This means that the phrase involves an adjective, a noun, the noun is third-person, it is singular, it is a food object.

When the user continues typing the longer phrase "red apple is awesome," the predicate of "is awesome" can be searched for in the list of allowable predicates for a noun phrase having the semantic tag of {adjective, noun, third-person, singular, food, subject/object}. As this phrase is allowable, it could be suggested (e.g., after the user typed "is" or fully typed by the user and subsequently sent to message recipients within the online community.

If the user types their own phrase following "red apple," the word/phrase elements in the potential chat phrase may be evaluated for combinability according to the word/phrase combinability rules (step 425). If the complete phrase is combinable, and the user selects to send the message (step 430), then at step 435, the phrase is sent to one or more recipients. That is, once an allowable phrase is generated (either through the user selecting suggestions or typing out a complete message), the user may select to send the resulting message to other members of the online community. Note, in one embodiment, the interface may indicate when an allowable message has been identified, e.g., by changing the color of text of the potential message or activating a send button. Further, when sending messages to a recipient, the message may be the text content, but other graphical representations could be made to a message as well. For example, assume a user sends the message "I like to eat pizza" or "Let's visit the castle." In these cases, elements of the message could be replaced with graphical representations, such as a picture representing the pizza or castle in the previous message.

Otherwise, if the user has not typed (or selected suggestions) that create an allowable chat phrase according to the combinability rules, then the method 400 returns to step 410 until additional words/phrases are typed or suggested words are selected and a combinable chat phrase is dynamically generated.

Figure 5A:
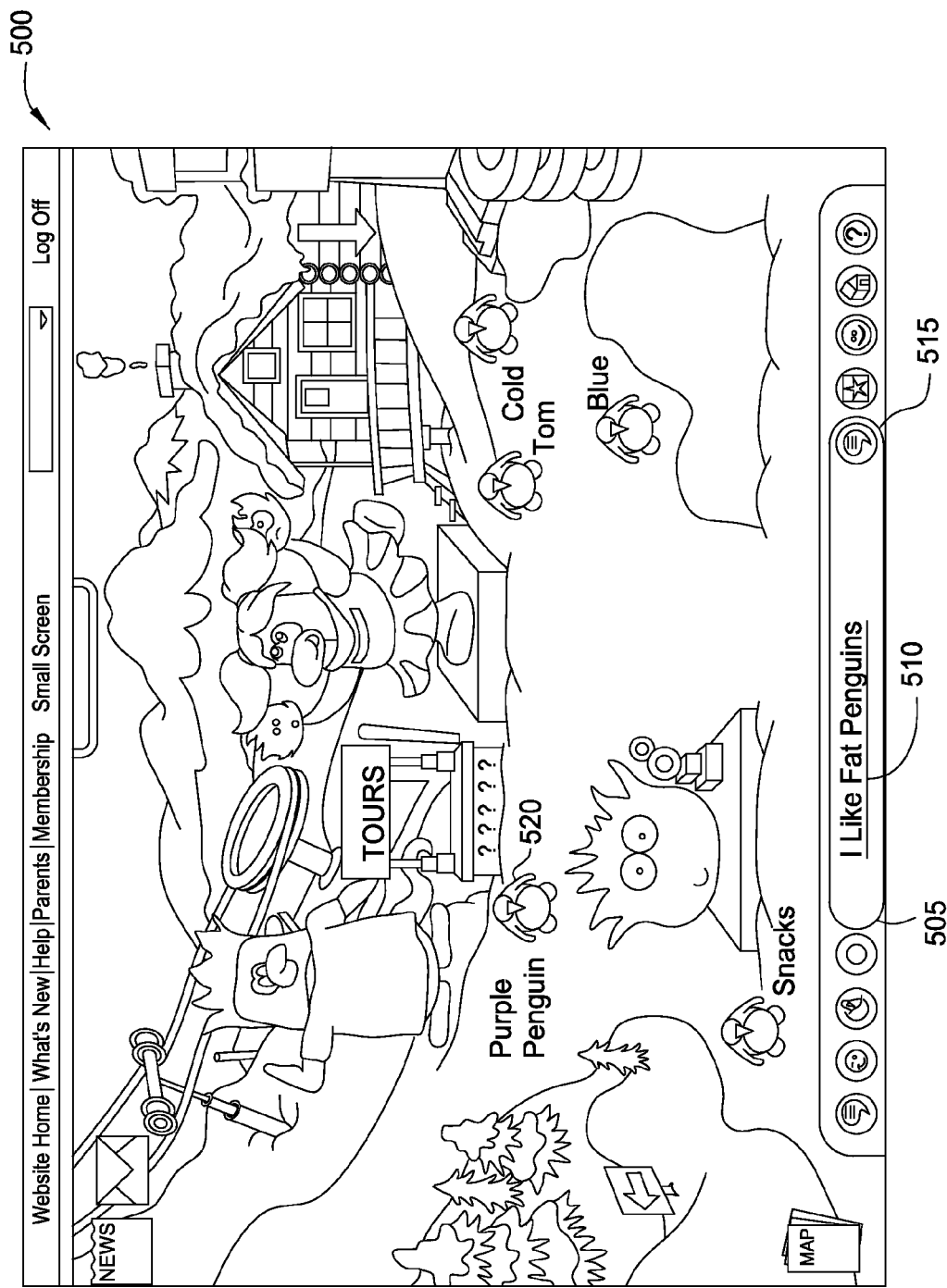
FIGS. 5A-5B illustrate an example of a chat message evaluated using the methods of FIGS. 3 and 4, according to one embodiment of the invention.
Figure 5B:
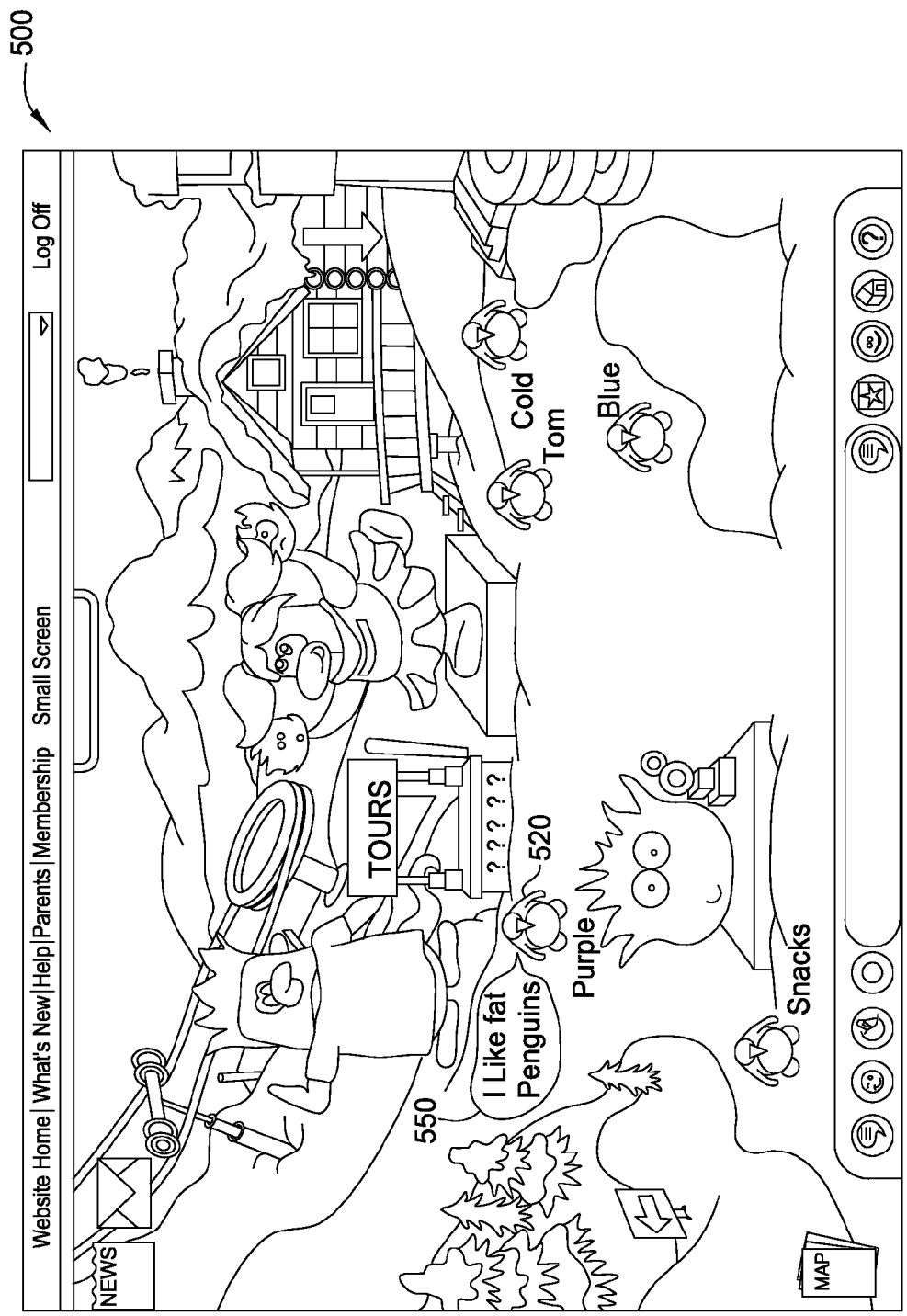

FIGS. 5A-5B illustrate an example of a dynamic chat phrase generated according to the methods of FIGS. 3 and 4, according to one embodiment of the invention. As shown in FIG. 5A, a rendering 500 presents a virtual environment where users can interact with one another via avatars. In this particular example, the virtual environment presents users with a virtual ski resort where the avatars are cartoon penguins. Illustratively, a number of avatars are shown present at the base of a virtual ski lift. Additionally, each avatar shows the corresponding user name. For this example, assume the avatar 520 "purplePengiun" corresponds to the user viewing rendering 500, while the other avatars represent other users also present in this virtual environment.

The user controlling avatar 520 can compose a chat message using interface 505. In this example, the user has typed the phrase "I like fat penguins." Once completed, the user can attempt to send this message by pressing send button 515. In response, the chat server evaluates this phrase using the combinability rules. For example, the phrase "I like" would be combinable itself and combinable with an allowed predicate. Further, the predicate in this case "fat penguins" could be allowed if the combinability rules allowed the use of the word "fat" as an adjective, e.g., in a "disparagement" category to modify nouns in an "animal" category. In one embodiment, the chat server could suggest combinable phrases to add to the current phrase. For example, the chat server could suggest "penguins" after the user types "I like fat," along with other elements of the "animal" category. Assuming this is the case, and the user selected "penguin" (instead of, e.g., "cat," "dog" or "fish"), the chat server builds the phrase "I like fat penguins" to send to other users of this virtual environment. This result is shown in FIG. 5B, where avatar 520 is rendered with a text bubble 550 presenting this chat message. In contrast, if the user had typed a phrase that was not combinable according to the rules, e.g., "I like fat girls," the chat serer would not send this message to other users present in the virtual environment. While the behavior of the interface may vary, in one embodiment, the send button 515 could be rendered in an inactive state until an allowed message has been identified. Alternatively, the interface could present the text bubble, to just the user attempting to send the message not allowed by the combinability rules.

In addition to generating suggestions using the dynamic phrase chat corpus, chat suggestions may also be generated form static phrase corpus as well. For example, a phrase may be matched against a static set of phrases raked by popularity. In one embodiment, a chat client monitors a user typing a phrase and sends it to the server which contains a phrase fragment that the server will compare against its database of top phrases. The "top" phrases may be selected as the most popular for a given site, cohort of users, or using any other criteria as appropriate in a particular case. However determined, a suitable set of phrases that contain the phrase fragment or equivalent context phrases will be returned to the chat client. These phrases may be presented to the user. The user can then select the appropriate phrase. Additional client side scrubbing of the list of phrases returned from the server would happen as the user continues to type the phrase until the proper phrase is displayed.

For example, once a user typed the initial phrase "do you want to," the following set of possible responses could be identified and presented to the user.

do you want to come over to my house
do you want to come to my party
do you want to play with me Further, once presented, if the user typed "play" then the first two phrase suggestions would be removed. Conversely, if the user typed "come" then the third phrase suggestion would be removed, allowing the user to select between them or type something else entirely.

In addition to generating chat messages to suggest and/or send to users of a virtual environment, the chat server may maintain a static phrase corpus of allowed phrases. For example, rather than build common phrases (e.g., "hi there!") to suggest (or send) dynamically, such phrases could be added to an allowed "white list." In one embodiment, when a user created message can be mapped to such a pre-approved message, the pre-approved message is sent and presented to message recipients, regardless of any "optional" typed in the message by the user.

Figure 6:
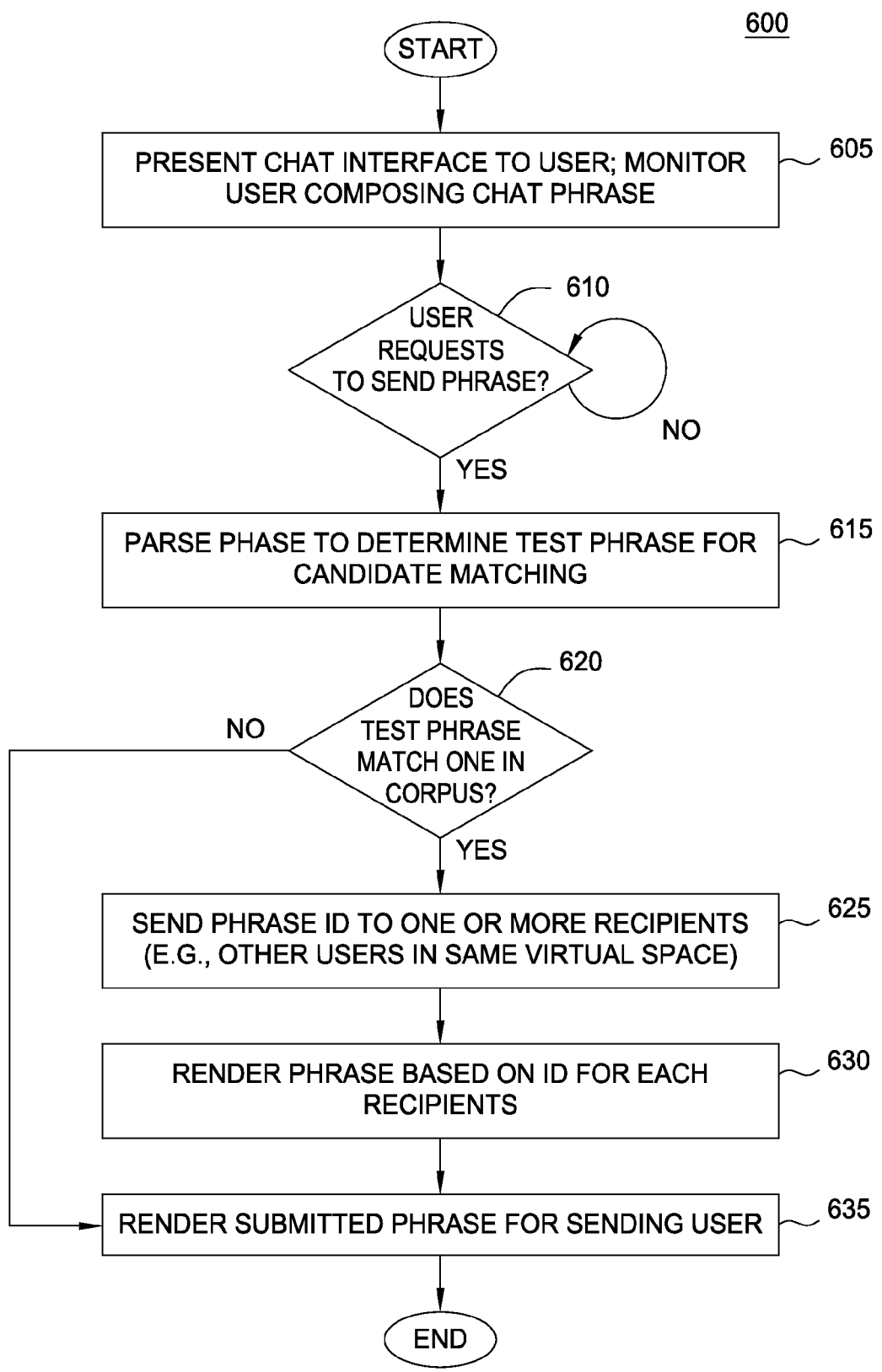
FIG. 6 illustrates a method for soft sending chat messages to users in an online environment, according to another embodiment of the invention.

For example, FIG. 6 illustrates a method for soft sending chat messages to users in an online environment, according to another embodiment of the invention. Note, the method 600 may be combined with approaches for dynamically generating phrase chat messages discussed herein, method 600 evaluates user-typed messages against a static phrase corpus as an example.

As shown, method 600 begins at step 605, where a chat interface is presented to a user as part of accessing an online environment. For example, the user may log on to a virtual online community, where the presence of that user is indicated by an avatar visible to other users of the community and where the user sees the avatars representing other users of the online community present at any given time. At step 610, a user requests to send a typed chat phrase to recipients. Note, the recipients may be anyone present in the same area of the virtual environment (as shown in FIG. 5B) or the sending user could specify one or more intended message recipients.

Once the user requests to send a chat message, the chat server may parse the phrase to derive a test phrase for matching with phrases in a static word corpus (step 615). The test phrase may remove one or more syntactic features of the received phrase without substantially changing the semantic meaning of the phrase. For example, in one embodiment, the chat server may remove more than two repeated letters, remove repeated words, and limiting the number of exclamation points (or other punctuation marks). Similarly, the chat server could reformat a phrase to standardize case, replace letter substitutions, remove numbers within text characters, etc. The resulting test phrase provides a message in a semi-canonical form which can be matched with phrases in the static phrase corpus (step 620). At step 625, if a match is found, then an identifier associated with the matched phrase can be sent to message recipients. Once received, each recipient renders the message in the semi-canonical form (step 630). Either way, the message is rendered for viewing by the sending user (step 635).

Figure 7A:
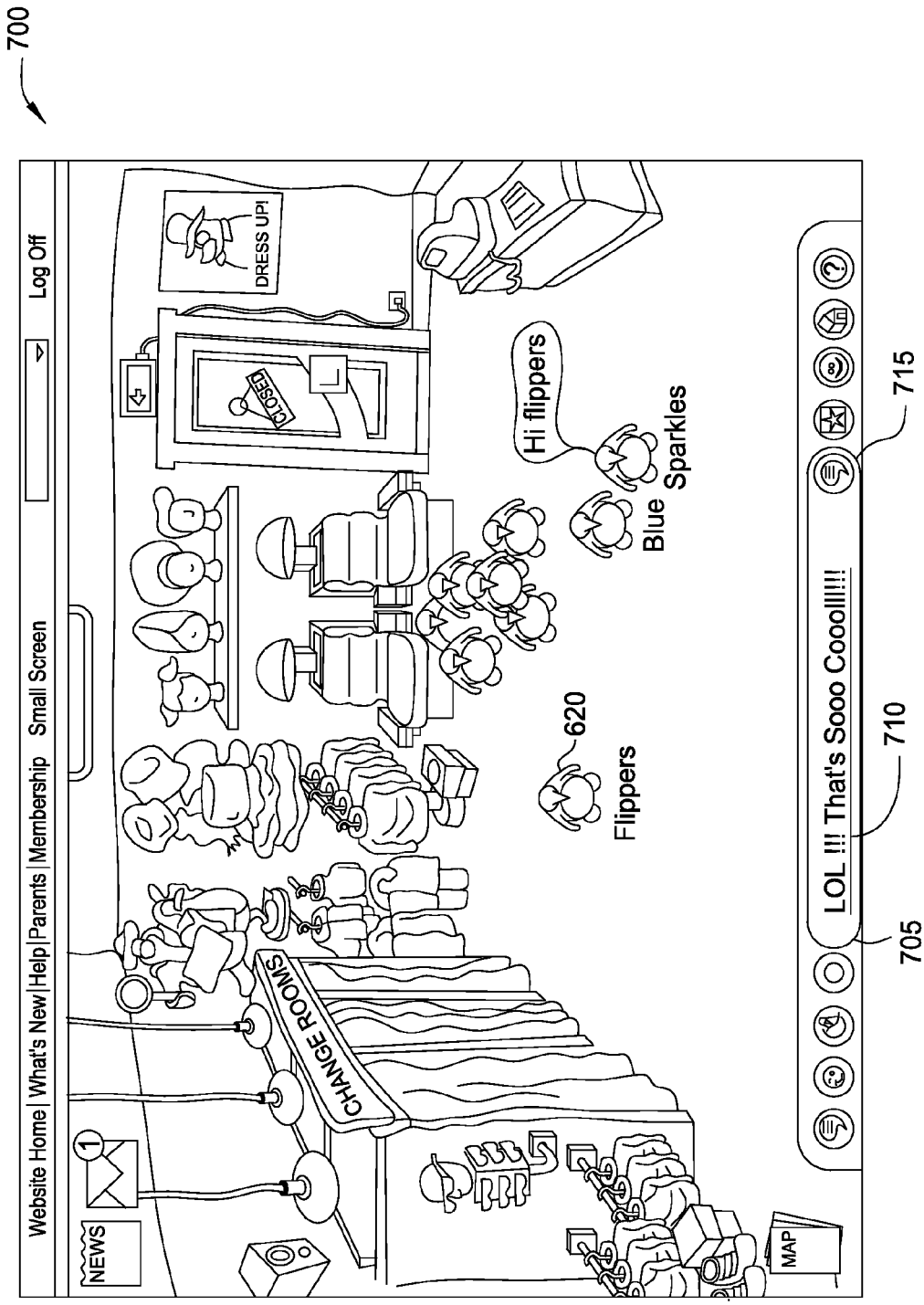
FIGS. 7A-7C illustrate an example of chat messages being exchanged in an online environment using the method of FIG. 6, according to one embodiment of the invention.
Figure 7B:
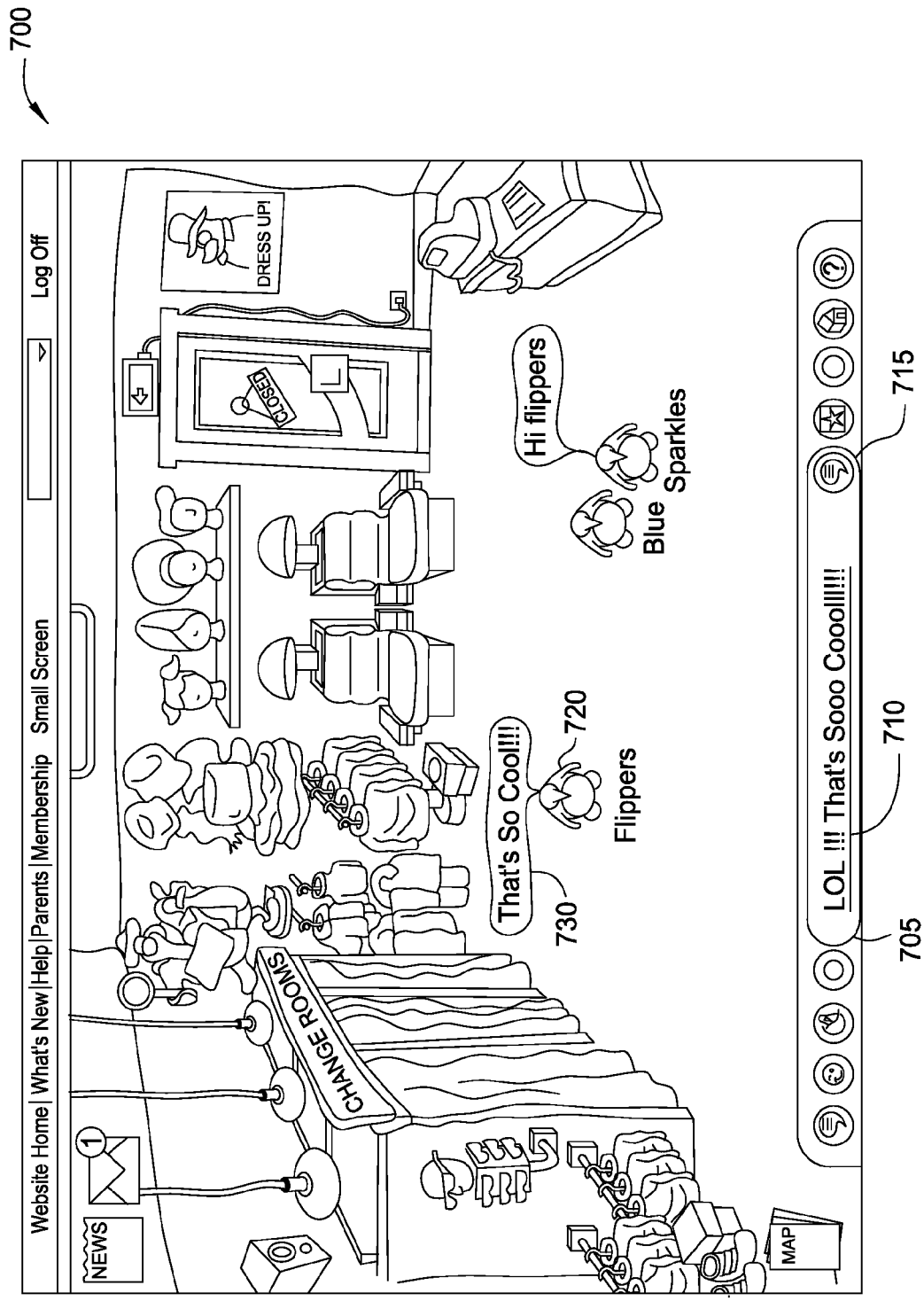
Figure 7C:
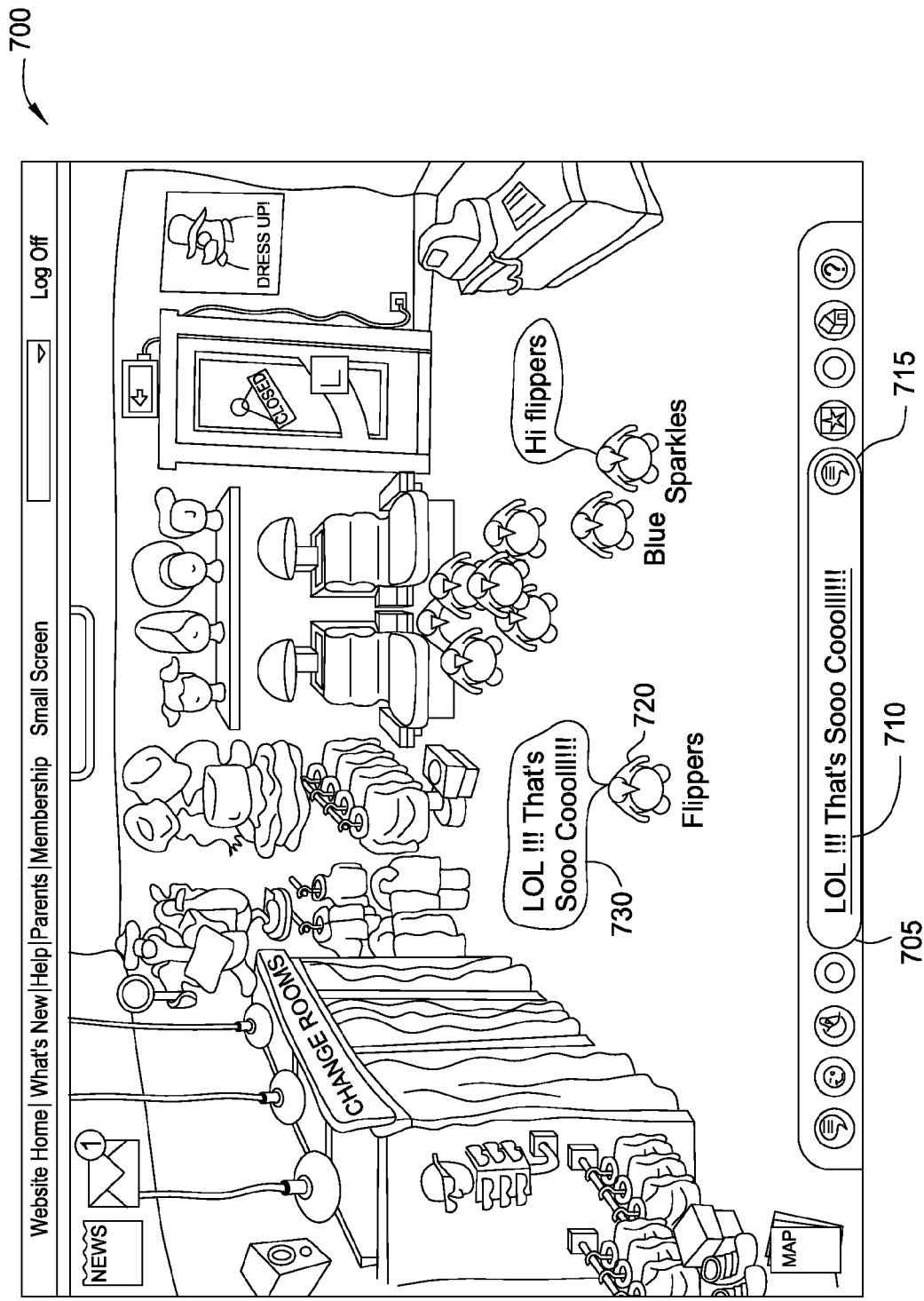

FIGS. 7A-7C illustrate an example of chat messages being "soft sent" in an online environment using the method of FIG. 6, according to one embodiment of the invention. As shown in FIG. 7A, a rendering 700 presents a virtual environment where users can interact with one another via avatars. In this particular example, the virtual environment presents users with a virtual clothing store where the avatars are cartoon penguins. For this example, assume the avatar 720 "Flippers" corresponds to the user viewing rendering 700, while the other avatars represent other users also present in this virtual environment.

The user controlling avatar 720 can compose a chat message using interface 705. In this example, the user has typed a phrase 710 of "LOL!!1 thats SOOO cooolll!!!." The user controlling avatar 720 can send phrase 710 using button 715. Once the user requests to send phrase 710, it may be evaluated by the chat server. For example, removing the optional phrase "LOL!!1," replacing "thats" with "that's," and removing repeated letters results in the semi-canonical phrases "that's so cool." The resulting phrase—"that's so cool"—is emulated against a static phrase corpus. Alternatively, the resulting phrase could be evaluated using the dynamic phrase chat process discussed above. Assume a match is found in the static phrase corpus. In such a case, the chat server sends a phrase ID corresponding to the phrase "—"that's so cool"— to each recipient. In addition, the chat server may restore some of the "optionals" to the phrase. For example, the trailing exclamation points could be added, and the phrase could be sent in uppercase letters (assuming the phrase composed by the user had a majority of letters in an uppercase format).

The result of "soft-sending" the phrase to recipients is shown in FIG. 7B. As shown in this Figure, avatar 720 is rendered with a text bubble 730 which includes the phrase from the static phrase word corpus, with the trailing exclamation points. Text bubble 730 is rendered with the phrase corpus for each user with an avatar in the virtual environment shown in FIG. 7B. In contrast, FIG. 7C shows the phrase rendered for the sending user. Again, avatar 720 is now rendered with a text bubble 730. However, the content of the text bubble 730 shows the chat message, as typed by the user controlling avatar 720. That is, the phrase is rendered for the sending user with all of the "optionals" intact.

In addition to dynamically generating chat messages to suggest and/or send to users of a virtual environment, and to "soft-sending" certain chat messages, the chat server may be further configured to build a set of suggestions as a user composes a chat message. However, given the large combinations of possible allowed chat messages, in one embodiment, the chat server may attempt to determine the "best" choice to present to a user when building a chat message. If none of the presented words are correct, the user can type out the next element of the desired chat message, and the chat server can again evaluate to resulting partial phrase to determine another set of "best" choices to present to the user. While the criteria for selecting the "best" choices may be tailored for a particular community of users or virtual environment, examples of factors that may be used include the popularity of the phrase, demographics of a given user base, the user's chat history, guest's avatar level and current activities, (quests, locations, etc.). For example, returning to the example of a store shown in FIGS. 7A-7C, users may be more likely to chat about items in the store (or topics related to same. This data could be used to aggressively favoring phrases containing "wigs" or "hats" in the suggested phrases as it is more like the user intends to say "I want a hat" over "I want pizza."

Figure 8:
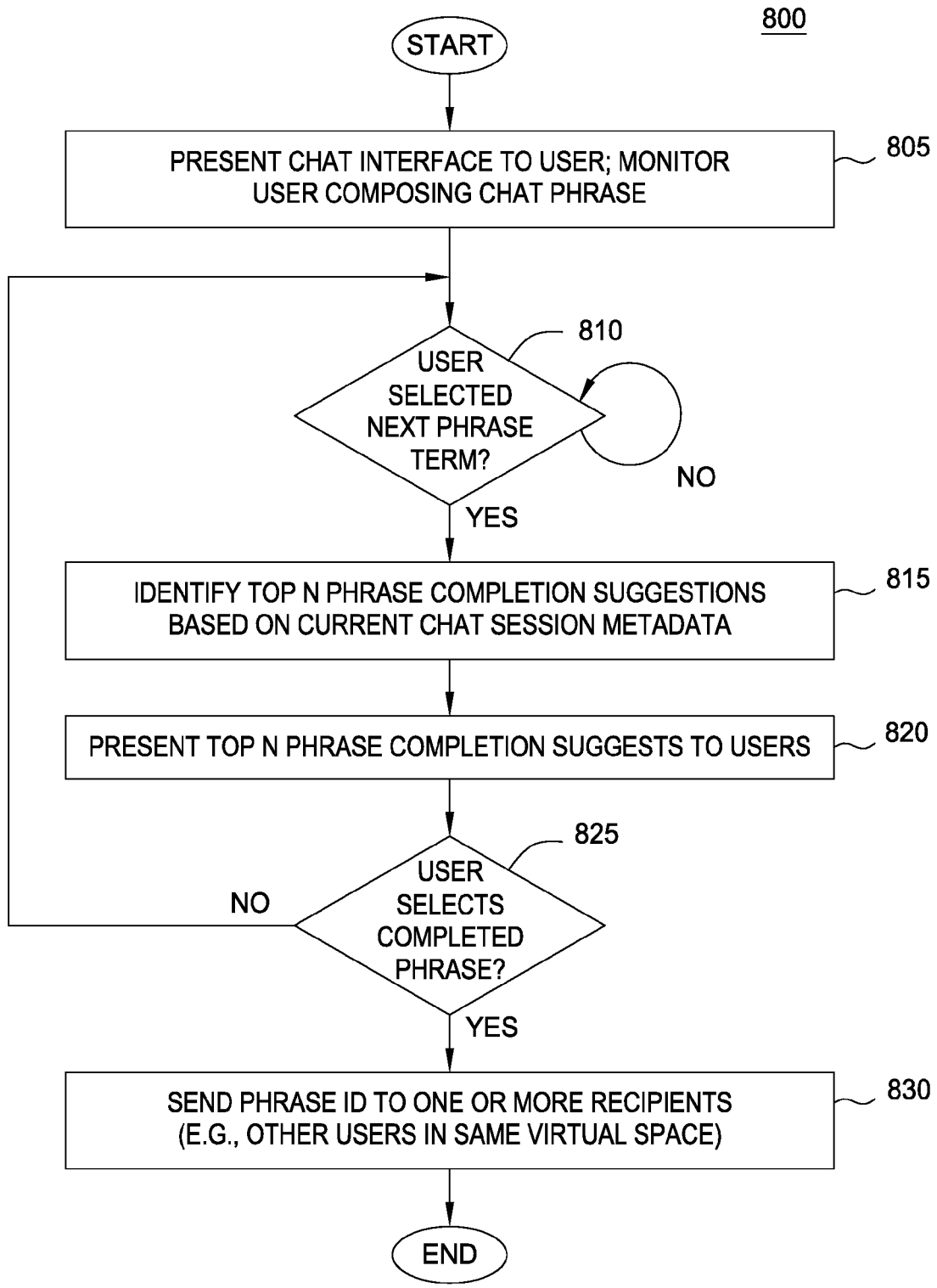
FIG. 8 illustrates a method for suggesting allowed chat phrase possibilities to a user in an online environment, according to one embodiment of the invention.

FIG. 8 illustrates a method 800 for suggesting chat phrase possibilities to a user in an online environment, according to one embodiment of the invention. As shown, method 800 begins at step 805, where a chat interface is presented to a user as part of accessing an online environment. For example, the user may log on to a virtual online community, where the presence of that user is indicated by an avatar visible to other users of the community and where the user sees the avatars representing other users of the online community present at any given time. Once a user selects (or types) a next term to include in a chat message (step 810), the chat server identifies the top N suggested terms to add to the phrase being composed by the user (step 815). Once identified, the top N choices may be presented to the user (step 820). The process (steps 810, 815 and 820) continues until a user selects to send a completed chat phrase (step 825.) At step 830, the resulting phrase can be sent to message recipients. Once received, each recipient renders the message.

Figure 9A:
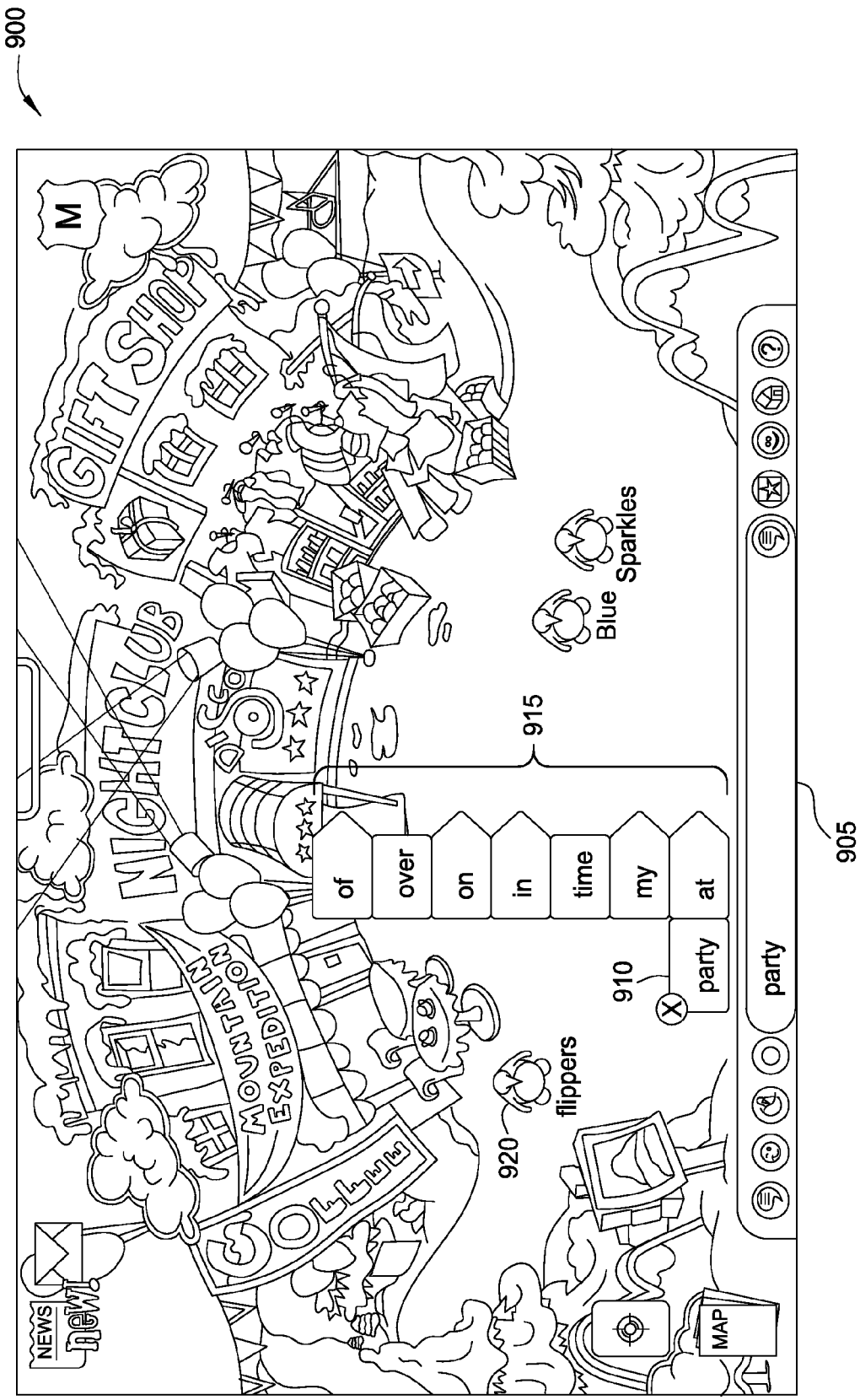
FIGS. 9A-9C illustrate an example of a chat message being composed in an online environment using the method of FIG. 8, according to one embodiment of the invention.
Figure 9B:
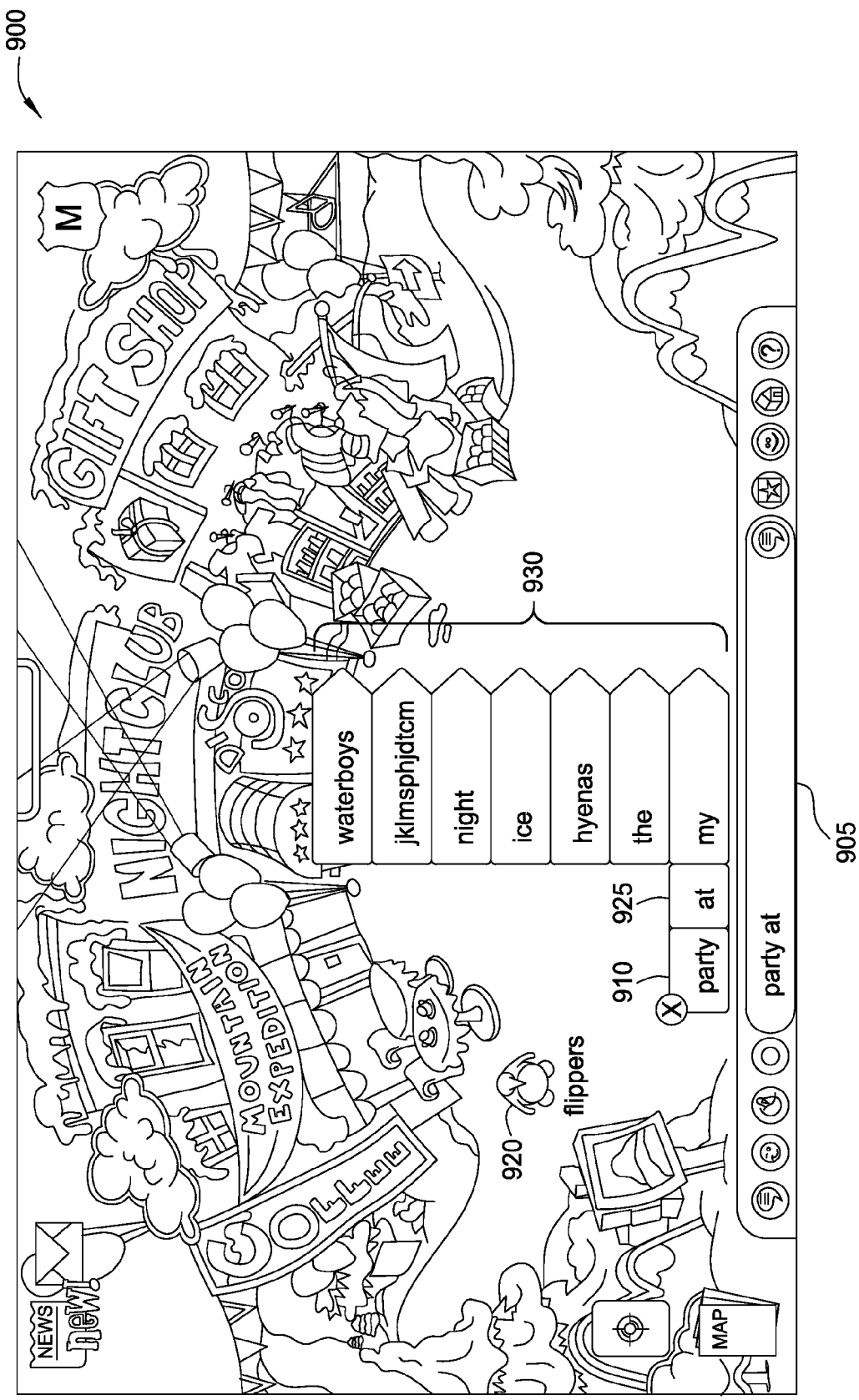
Figure 9C:
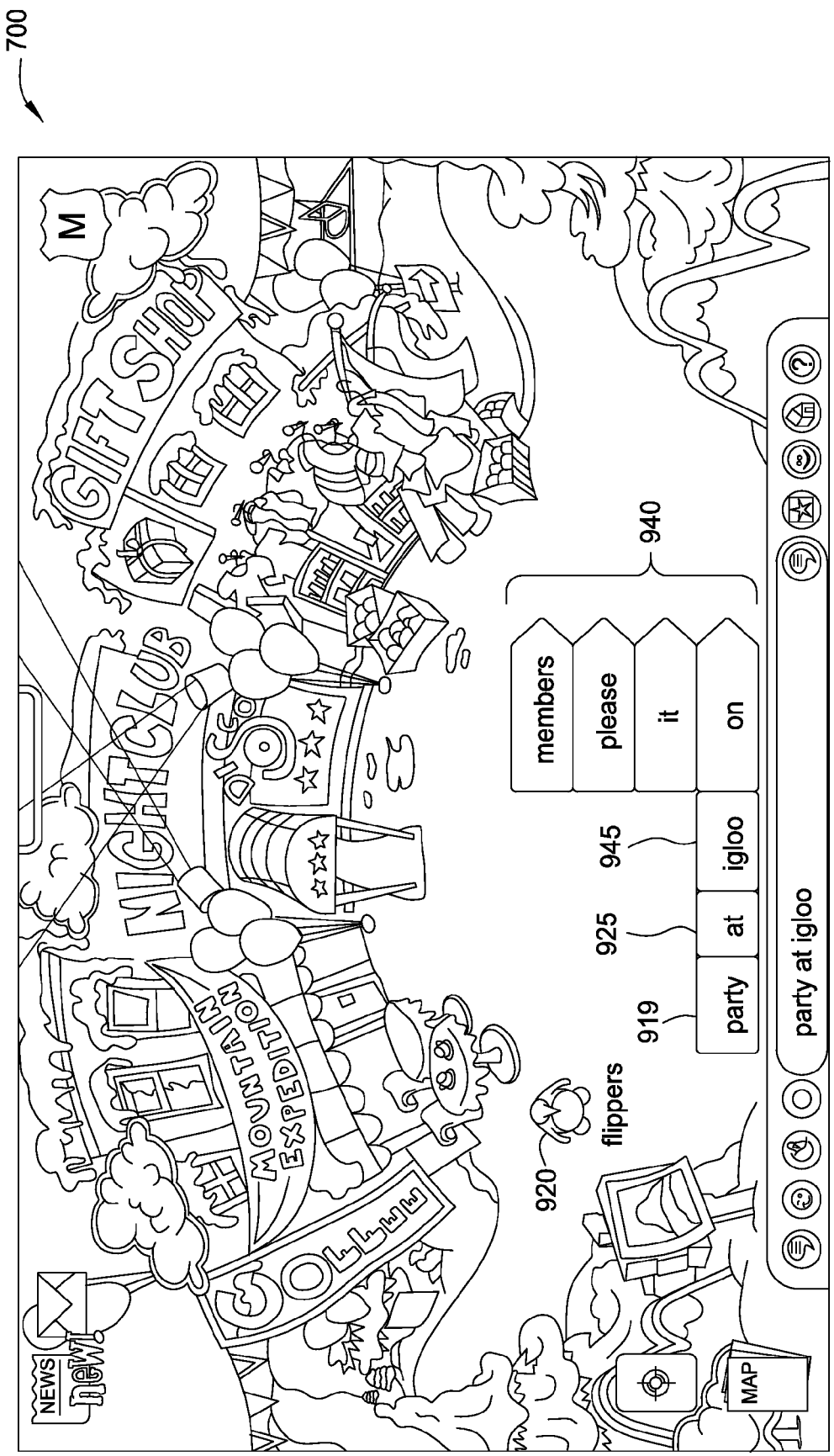

FIGS. 9A-9C illustrate an example of a chat message being composed in an online environment using the method of FIG. 8, according to one embodiment of the invention. As shown in FIG. 9A, a rendering 900 presents a virtual environment where users can interact with one another via avatars. In this particular example, the virtual environment presents users with an outdoor street, where the avatars are cartoon penguins. For this example, assume the avatar 920 (with a username of "Flippers") corresponds to the user viewing rendering 900, while the other avatars represent other users also present in this virtual environment.

Illustratively, the user controlling avatar 920 is typing a chat message in the interface 905 that begins with the word "party." A word-block 910 shows the word entered by the user. Further, a word-stack 915 shows a set of choices to extend the phrase being composed. As described, the particular words in the word-stack 915 may be determined as the "best" choices relative to the current phrase "party" and relative to other criteria such as the most popular words or based on the current location of the user. In this particular example, the user selects one of the suggestions—the word "at." This result is shown in FIG. 9B, where word-blocks 910 and 925 represent the current state of the chat message as it is being composed. A second word-stack 930 shows a second set of choices which the user can select. Importantly, the choices shown in the word-stack 930 are determined relative to the complete current phrase "party at" not just the last word "at." That is, the "best" choices are determined relative to the current phrase, not individual words.

Continuing with the present example, FIG. 9C shows a third word-stack 940 determined for the current phrase "party at igloo" composed form word-blocks 910, 925, and 945. Note, in this example, the user did not select any of the "best" choices from word-stack 930 shown in FIG. 9B. Instead, the user typed out a new word "igloo" to be added to the chat message. At the same time, the chat server responds by evaluating the complete phrase "party at igloo" to determine the words to include in word-stack 940. This example illustrates that the "best" choices are determined relative to the current phrase, not individual words, even when the words are added to the phrase by the user typing, instead of selecting one of the "best" words from a current word-stack. This process continues until a user completes composing a phrase and decides to send it to one or more recipients, such as all the people in the same location of the virtual environment as the sending user.

Figure 10:
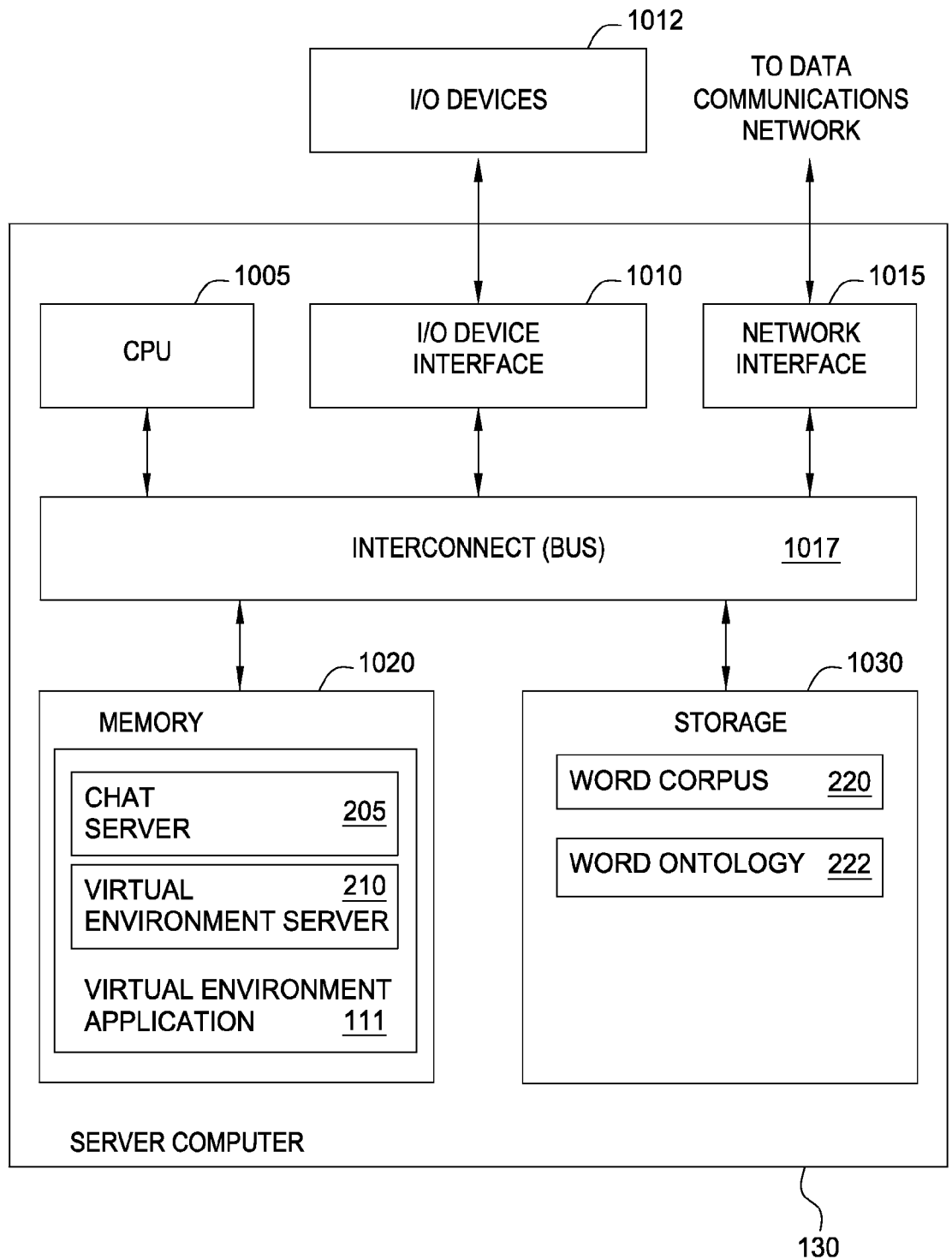
FIG. 10 is a more detailed view of the client computing system of FIG. 1, according to one embodiment of the invention.

FIG. 10 is a more detailed view of the server computing system of FIG. 1, according to one embodiment of the invention. As shown, the server system 105 includes, without limitation, a central processing unit (CPU) 1005, a network interface 1015, a bus 1017, a memory 1020, and storage 1030. The server system 105 also includes an I/O device interface 1010, connecting the server system 105 to I/O devices 1012 (e.g., keyboard, display and mouse devices). As described above, the server system 105 provides a computing system configured to host a multi-user virtual environment application 111.

CPU 1005 retrieves and executes programming instructions stored in the memory 1020. Similarly, CPU 1005 stores and retrieves application data residing in the memory 1020. The bus 1017 is used to transmit programming instructions and application data between the CPU 1005, I/O devices interface 1010, storage 1030, network interface 1015, and memory 1020. CPU 1005 is included to be representative of a single CPU, multiple CPUs, a single CPU having multiple processing cores, and the like. And the memory 1020 is generally included to be representative of a random access memory. The storage 1030 may be a disk drive storage device. Although shown as a single unit, the storage 1030 may be a combination of fixed and/or removable storage devices, such as magnetic disc drives, solid state drives (SSD), removable memory cards, optical storage, network attached storage (NAS), or a storage area-network (SAN).

Illustratively, the memory 1020 includes the multi-user virtual environment application 111, which includes a chat server 205 and virtual environment server 210. As noted, virtual environment application 111 and chat server 205 provides a software application configured to implement any of the approaches discussed above for managing chat communications shared among users of the hosted virtual environments. The storage 1030 includes the current word corpus (the individual words from which chat messages may be composed) and a word ontology 222. As described above, the word ontology 222 may provide semantic annotations for the individual words in the word corpus 222.

Figure 11:
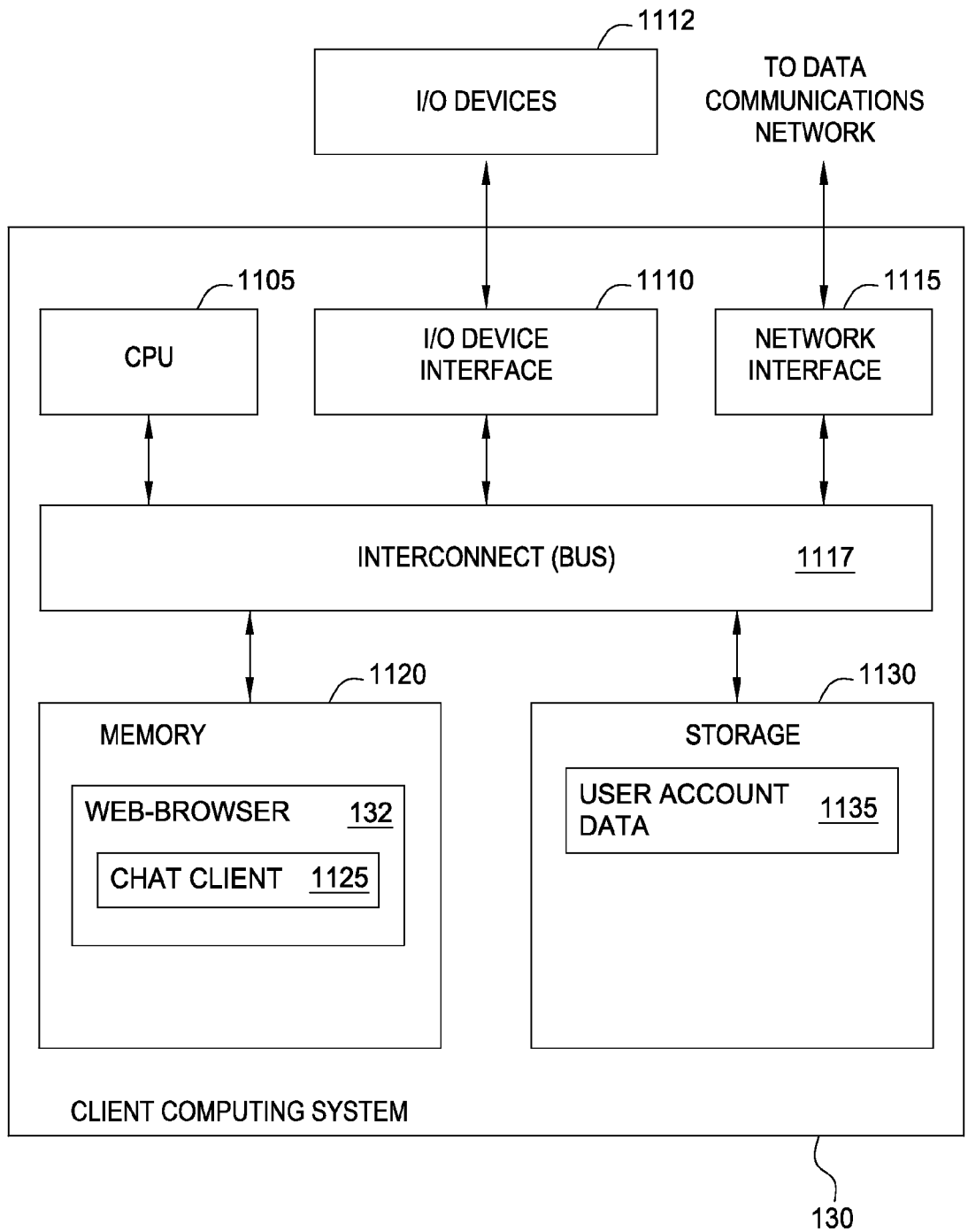
FIG. 11 is a more detailed view of the server computing system of FIG. 1, according to one embodiment of the invention.

FIG. 11 is a more detailed view of the client computing system 130 of FIG. 1, according to one embodiment of the invention. As shown, the client computing system 130 includes, without limitation, a central processing unit (CPU) 1105, a network interface 1115, a bus 1117, a memory 1120, and storage 1130. The computing system 130 also includes an I/O device interface 1110 connecting I/O devices 1112 to the computing system 130 (e.g., a keyboard, mouse, or remote control, along with a monitor (e.g., an LCD panel).

Like CPU 1005, CPU 1105 is included to be representative of a single CPU, multiple CPUs, a single CPU having multiple processing cores, etc., and the memory 1120 is included to be representative of a random access memory. The bus 1117 connects CPU 1105, I/O devices interface 1110, storage 1130, network interface 1115, and memory 1120. The network interface 1115 is configured to transmit data via the communications network 120, e.g., to access a virtual environment hosted by the server system 105. Storage 1130, such as a hard disk drive or solid-state (SSD) storage drive, may store game data files along with other content.

Illustratively, the memory 1120 includes a web browser 132, which itself includes a chat client 1125. And storage 1135 stores user account data 1135 and user configuration setting as needed to facilitate a user interacting with a hosted online virtual envenomed. For example, described above, the web browser 132 may access a server access the virtual environment and chat client, allowing a user to participate in game play, as well as communicate with other users via chat client 1125.

Advantageously, embodiments of the invention provide a variety of techniques for supplying users in an online environment with a safe and effective chat facility. For example, in one embodiment, the allowability of given phrase (or suggested phrase) is determined dynamically as a user types a phrase (or requests to send a phrase) based on a set of word combinability rules. In another embodiment, the chat system is configured to "soft" send certain messages sent by one user to others. A message is "soft-sent when the actual message sent the recipients removes "optional" from the user-supplied message. In yet another embodiment, phrase suggestions are made to a user while they compose a chat message, where the selections are determined relative to a variety of factors, including, e.g., the popularity of the phrase, the user's chat history, guest's avatar level and current activities, quests, locations and items held within the game.

While the foregoing is directed to embodiments of the present invention, other and further embodiments of the invention may be devised without departing from the basic scope thereof, and the scope thereof is determined by the claims that follow.

What is claimed is:

1. A computer-implemented method for facilitating communication between users, comprising:
   receiving, from a first user, a text phrase;
   modifying the text phrase to remove one or more syntactic features of the text phrase while maintaining a semantic meaning of the received text phrase, wherein at least one of the syntactic features comprises a repeated alphanumeric character, a repeated word, or one or more punctuation characters included with the text phrase;
   matching the modified text phrase against a corpus of allowed chat phrases; and
   upon determining the modified text phrases matches one of the allowed chat phrases in the corpus:
      sending an identifier corresponding to the matched text phrase to at least a second user, and
      sending, with the identifier corresponding to the matched text phrase, an indication of at least one syntactic feature removed from the text phrase, wherein the at least one syntactic feature removed from the text phrase is restored into the matched text phrase.

2. The method of claim 1, wherein the words in the chat vocabulary are determined from a chat history of chat messages exchanged between users in an online virtual environment.

3. The method of claim 1, further comprising, rendering, for view by the first user, the text phrase on an interface presenting an avatar representing the first user.

4. The method of claim 1, further comprising, rendering, for view by the second user, the modified text phrase on an interface presenting an avatar representing the first user.

5. The method of claim 1, further comprising, upon determining the modified text phrase does not match any of the allowed chat phrases in the corpus, rendering, for view by the first user, the text phrase on an interface presenting an avatar representing the first user.

6. The method of claim 5, further comprising, presenting an indication to the first user that the chat message was not sent to the second user.

7. The method of claim 1, wherein an indication of at least one of the removed syntactic features of the text message is sent to at least the second user.

8. A nontransitory computer-readable storage medium storing a program, which, when executed by a processor performs an operation for facilitating communication between users, the operation comprising:
   receiving, from a first user, a text phrase;
   modifying the text phrase to remove one or more syntactic features of the text phrase while maintaining a semantic meaning of the received text phrase, wherein at least one of the syntactic features comprises a repeated alphanumeric character, a repeated word, or one or more punctuation characters included with the text phrase;
   matching the modified text phrase against a corpus of allowed chat phrases; and
   upon determining the modified text phrases matches one of the allowed chat phrases in the corpus:
      sending an identifier corresponding to the matched text phrase to at least a second user, and
      sending, with the identifier corresponding to the matched text phrase, an indication of at least one syntactic feature removed from the text phrase, wherein the at least one syntactic feature removed from the text phrase is restored into the matched text phrase.

9. The computer-readable storage medium of claim 8, wherein the words in the chat vocabulary are determined from a chat history of chat messages exchanged between users in an online virtual environment.

10. The computer-readable storage medium of claim 8, wherein the operation further comprises, rendering, for view by the first user, the text phrase on an interface presenting an avatar representing the first user.

11. The computer-readable storage medium of claim 8, wherein the operation further comprises, rendering, for view by the second user, the modified text phrase on an interface presenting an avatar representing the first user.

12. The computer-readable storage medium of claim 8, wherein the operation further comprises, upon determining the modified text phrase does not match any of the allowed chat phrases in the corpus, rendering, for view by the first user, the text phrase on an interface presenting an avatar representing the first user.

13. The computer-readable storage medium of claim 12, wherein the operation further comprises, presenting an indication to the first user that the chat message was not sent to the second user.

14. The computer-readable storage medium of claim 8, wherein an indication of at least one of the removed syntactic features of the text message is sent to at least the second user.

15. A system, comprising:
a processor; and
a memory, wherein the memory includes an application program configured to perform an operation for facilitating communication between users, the operation comprising:
receiving, from a first user, a text phrase,
modifying the text phrase to remove one or more syntactic features of the text phrase while maintaining a semantic meaning of the text phrase, wherein at least one of the syntactic features comprises a repeated alphanumeric character, a repeated word, or one or more punctuation characters included with the text phrase,
matching the modified text phrase against a corpus of allowed chat phrases, and
upon determining the modified text phrases matches one of the allowed chat phrases in the corpus:
sending an identifier corresponding to the matched text phrase to at least a second user; and
sending, with the identifier corresponding to the matched text phrase, an indication of at least one syntactic feature removed from the text phrase, wherein the at least one syntactic feature removed from the text phrase is restored into the matched text phrase.

16. The system of claim 15, wherein the words in the chat vocabulary are determined from a chat history of chat messages exchanged between users in an online virtual environment.

17. The system of claim 15, wherein the operation further comprises, rendering, for view by the first user, the text phrase on an interface presenting an avatar representing the first user.

18. The system of claim 15, wherein the operation further comprises, rendering, for view by the second user, the modified text phrase on an interface presenting an avatar representing the first user.

19. The system of claim 15, wherein the operation further comprises, upon determining the modified text phrase does not match any of the allowed chat phrases in the corpus, rendering, for view by the first user, the text phrase on an interface presenting an avatar representing the first user.

20. The system of claim 19, wherein the operation further comprises, presenting an indication to the first user that the chat message was not sent to the second user.

21. The system of claim 15, wherein an indication of at least one of the removed syntactic features of the text message is sent to at least the second user.

* * * * *